(12) United States Patent
Ishii et al.

(10) Patent No.: US 8,029,612 B2
(45) Date of Patent: Oct. 4, 2011

(54) INK JET INK, INK JET RECORDING METHOD, INK CARTRIDGE, RECORDING UNIT, AND INK JET RECORDING APPARATUS

(75) Inventors: Mitsuru Ishii, Kamagaya (JP); Hiroshi Tomioka, Tokyo (JP); Daiji Okamura, Yokohama (JP); Hideki Yamakami, Kawasaki (JP); Satoshi Kudo, Kawasaki (JP); Otome Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 12/390,035

(22) Filed: Feb. 20, 2009

(65) Prior Publication Data

US 2009/0238976 A1    Sep. 24, 2009

(30) Foreign Application Priority Data

Mar. 19, 2008 (JP) ................. 2008-072278

(51) Int. Cl.
*C09D 11/02* (2006.01)
*B41J 2/01* (2006.01)
(52) U.S. Cl. .................. 106/31.48; 106/31.58; 347/100
(58) Field of Classification Search .............. 106/31.48, 106/31.58; 347/100; 427/256
See application file for complete search history.

(56) References Cited

U.S. PATENT DOCUMENTS

| 4,840,674 | A | * | 6/1989 | Schwarz ............. 106/31.43 |
| 5,169,436 | A | * | 12/1992 | Matrick ............. 106/31.58 |
| 5,540,764 | A | * | 7/1996 | Haruta et al. ........ 106/31.58 |

(Continued)

FOREIGN PATENT DOCUMENTS

CN    1646643 A    7/2005

(Continued)

OTHER PUBLICATIONS

Jun. 2, 2011 Chinese Official Action in Chinese Patent Application No. 200910129241.5.

*Primary Examiner* — Helene Klemanski
(74) *Attorney, Agent, or Firm* — Fitzpatrick, Cella, Harper & Scinto

(57) ABSTRACT

The present invention provides an ink jet ink, which gives a superior lightfastness to an ink image, has a superior sticking resistance and intermittent ejection stability, and gives a preferable color tone to the image. The ink includes an azo-based dye represented by formula (I) and a water-soluble organic solvent represented by bis(2-hydroxyethyl)sulfone represented by formula (II).

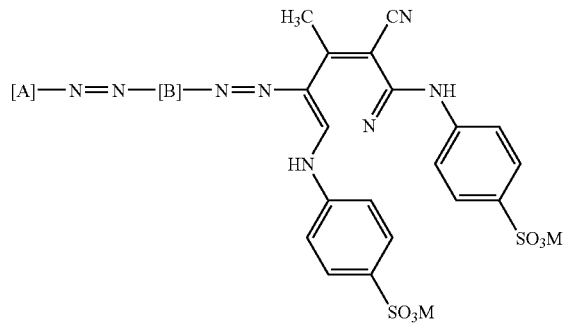

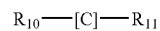

11 Claims, 6 Drawing Sheets

U.S. PATENT DOCUMENTS

| | | | |
|---|---|---|---|
| 6,398,355 B1 * | 6/2002 | Shirota et al. | 347/100 |
| 6,474,803 B1 * | 11/2002 | Shirota et al. | 347/100 |
| 6,863,719 B2 * | 3/2005 | Butler et al. | 106/31.48 |
| 7,144,452 B2 | 12/2006 | Takayama et al. | 106/31.52 |
| 7,160,372 B2 | 1/2007 | Yoshizawa et al. | 106/31.47 |
| 7,198,664 B2 | 4/2007 | Mafune et al. | 106/31.28 |
| 7,198,665 B2 | 4/2007 | Nakamura et al. | 106/31.52 |
| 7,201,791 B2 | 4/2007 | Okamura et al. | 106/31.47 |
| 7,208,033 B2 | 4/2007 | Kawabe et al. | 106/31.48 |
| 7,244,299 B2 | 7/2007 | Tsuji et al. | 106/31.48 |
| 7,247,194 B2 | 7/2007 | Okamura et al. | 106/31.47 |
| 7,247,196 B2 | 7/2007 | Sato et al. | 106/31.52 |
| 7,270,701 B2 | 9/2007 | Jinnou et al. | 106/31.47 |
| 7,297,197 B2 | 11/2007 | Jinnou et al. | 106/31.47 |
| 7,533,978 B2 | 5/2009 | Chino et al. | |
| 7,550,037 B2 * | 6/2009 | Mafune et al. | 106/31.48 |
| 7,553,358 B2 | 6/2009 | Okamura et al. | 106/31.48 |
| 7,566,362 B2 | 7/2009 | Mori et al. | 106/31.48 |
| 7,618,484 B2 * | 11/2009 | Fujimoto et al. | 106/31.48 |
| 7,682,433 B2 * | 3/2010 | Yanagimachi et al. | 106/31.6 |
| 2005/0243151 A1 | 11/2005 | Chino et al. | |
| 2006/0009357 A1 | 1/2006 | Fujiwara et al. | 503/227 |
| 2006/0162616 A1 | 7/2006 | Chino et al. | 160/31.51 |
| 2007/0148376 A1 | 6/2007 | Tomioka et al. | 428/32.1 |
| 2008/0018722 A1 | 1/2008 | Mafune et al. | 347/100 |
| 2008/0151028 A1 | 6/2008 | Yamakami et al. | 347/100 |
| 2008/0274284 A1 | 11/2008 | Fujimoto et al. | 427/256 |
| 2008/0274286 A1 | 11/2008 | Yamashita et al. | 427/256 |
| 2008/0280041 A1 | 11/2008 | Nishino et al. | 427/256 |
| 2008/0280042 A1 | 11/2008 | Yanagimachi et al. | 427/256 |
| 2008/0280043 A1 | 11/2008 | Moribe et al. | 427/256 |
| 2008/0280044 A1 | 11/2008 | Okamura et al. | 427/258 |
| 2009/0011130 A1 * | 1/2009 | Mafune et al. | 106/31.48 |
| 2009/0047430 A1 * | 2/2009 | Mori et al. | 106/31.48 |
| 2009/0238977 A1 * | 9/2009 | Kawabe et al. | 427/256 |
| 2009/0274840 A1 * | 11/2009 | Yamakami et al. | 427/256 |

FOREIGN PATENT DOCUMENTS

| | | |
|---|---|---|
| EP | 1 767 585 A1 | 3/2007 |
| EP | 1 990 383 A1 | 11/2008 |
| EP | 2 028 239 A1 | 2/2009 |
| JP | 10-60347 | 3/1998 |
| JP | 2004-83492 | 3/2004 |
| JP | 2005-139427 | 6/2005 |
| WO | WO 2004/113463 A1 | 12/2004 |
| WO | WO 2006/001274 | 1/2006 |

* cited by examiner

INK JET INK, INK JET RECORDING METHOD, INK CARTRIDGE, RECORDING UNIT, AND INK JET RECORDING APPARATUS

BACKGROUND OF THE INVENTION

1. Field of the Invention

The present invention relates to an ink jet ink, an ink jet recording method, an ink cartridge, a recording unit, and an ink jet recording apparatus.

2. Description of the Related Art

An ink jet recording method is a recording method of applying an ink droplet onto a recording medium such as a plain paper and a glossy medium to form an image on the medium, and becomes increasingly popular because of being inexpensive and having an enhanced recording speed. With the advancement of the high image quality of the image to be obtained by the ink jet recording method and the rapid spread of a digital camera, the ink jet recording method is widely used as a method of outputting an image equivalent to that by a silver salt photography.

In recent years, the image to be obtained by the ink jet recording method has a trend of forming an image of higher quality than before, due to a minimized droplet of ink to be ejected from an ink jet system and a widened color gamut by the introduction of a multicolor ink. However, on the other hand, demands for a coloring material and an ink further increase, and severer characteristics are required for color developability and reliability such as clogging and ejection stability. Particularly, an ink to be applied to the ink jet recording system which ejects an ink from a recording head by an action of a thermal energy and records data is required to have the following characteristics. Specifically, in this case, the ink is required to have such characteristics as not to cause kogation and a break in a heater in the recording head even when the predetermined number of electrical pulses are applied onto the recording head, in other words, as to be superior in recording durability.

On the other hand, an ink jet recording method has a problem that an obtained image may not have sufficient fastness properties (image retainability). Generally, the image obtained by the ink jet recording method shows low image retainability compared to that of the silver salt photograph. Specifically, the image has a problem of easily causing a color tone change and color fading due to the deterioration of a coloring material on the image, when a recording article is exposed to light, moisture, heat, an environmental gas existing in the air and the like for a long period. Particularly, the image which has been recorded by using an ink containing dye as a coloring material has a problem in fastness properties and lightfastness. Among them, the low lightfastness is a problem, which originates in a chemical reaction peculiar to the coloring material.

A large number of technologies are conventionally proposed in order to enhance the lightfastness of the image by solving the problem of the lightfastness. For instance, there is a proposal concerning a black dye having both high fastness properties and color developability (see Japanese Patent Application Laid-Open No. 2005-139427 and International Publication No. WO2006/001274).

There is also a proposal of making bis(2-hydroxyethyl) sulfone contained in an ink to be applied to the ink jet recording method, for the purpose of enhancing the reliability of the ink (see Japanese Patent Application Laid-Open No. H10-060347).

SUMMARY OF THE INVENTION

With the advancement of higher image quality of an ink jet recorded image, the level also becomes higher which is required for the fastness properties of an image. For this reason, the present inventors made an investigation for an ink containing a black dye, which is described in Japanese Patent Application Laid-Open No. 2005-139427 and International Publication No. WO2006/001274 that were described in the above. However, it was found that the images which have been obtained with the use of these inks do not have fastness properties reaching a level of being required in recent years. Furthermore, the present inventors also made an investigation on enhancing the fastness properties of the image that had been recorded with the use of the above described ink containing the black dye, by using a compound or the like, which is conventionally known to be capable of enhancing the fastness properties of the image. However, it was found that such a compound causes a new problem which will be described below when being used together with the above described black dye.

It was firstly found that the compound causes a problem of a clogging of the ink at an ejection port of a recording head, in other words, that the ink does not have sufficient sticking resistance. It was also found that after an ink jet recording apparatus has been left for a fixed period of time in a state of not ejecting the ink, the ink causes a problem of not being properly ejected due to the evaporation of a water content in an ink or the like from the ejection port, in other words, a problem of not having a sufficient intermittent ejection stability.

Accordingly, an object of the present invention is to provide an ink jet ink, which gives a superior lightfastness to an image recorded by using the ink, and has a superior sticking resistance and intermittent ejection stability. The object of the present invention is further to provide an ink jet ink, which shows superior recording durability even when being applied to an ink jet recording system for ejecting the ink by using an action of thermal energy, and has a color tone preferable as a black ink. Another object of the present invention is to provide an ink jet recording method, an ink cartridge, a recording unit and an ink jet recording apparatus which can stably provide an image that has superior lightfastness and high retainability by using the above described ink jet ink.

The present invention is directed to an ink jet ink containing at least a compound represented by the following general formula (I) and a compound represented by the following general formula (II):

General formula (I)

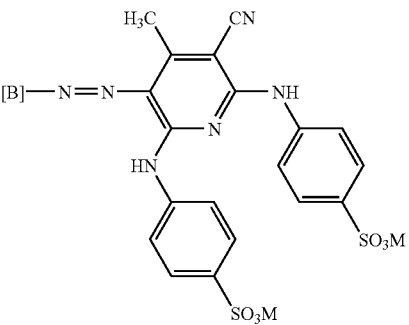

wherein, in general formula (I), [A] represents an optionally substituted aromatic group or heterocyclic group; —[B]— represents a group represented by any one of the following general formulas (1) to (5); and M represents each independently any one of a hydrogen atom, an alkaline metal, ammonium and an organic ammonium,

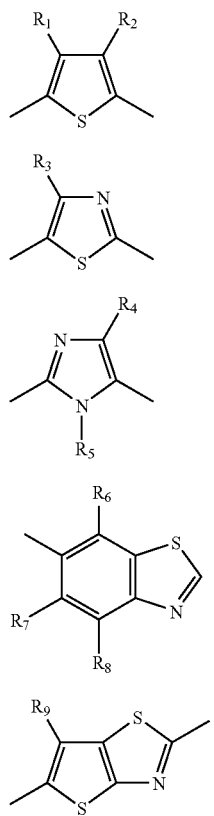

General formula (1)

General formula (2)

General formula (3)

General formula (4)

General formula (5)

wherein, in general formulas (1) to (5), $R_1$ to $R_9$ represent each independently any one of a hydrogen atom, a halogen atom, an aliphatic group, an aromatic group, a heterocyclic group, a carboxy group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino or arylsulfonylamino group, a heterocyclic sulfonylamino group, a cyano group, a nitro group, an alkylthio or arylthio group, a heterocyclic thio group, an alkylsulfonyl or arylsulfonyl group, a heterocyclic sulfonyl group, an alkylsulfinyl or arylsulfinyl group, a heterocyclic sulfinyl group, a sulfamoyl group and a sulfonate group, wherein each of the groups is optionally substituted,

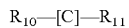   General formula (II)

wherein, in general formula (II), —[C]— represents —S—, —S(=O)—, or —S(=O)$_2$—; and $R_{10}$ and $R_{11}$ each independently represent any one of a hydrogen atom, a hydroxyl group, an alkyl group, a hydroxyalkyl group, an alkenyl group, an acyl group, a carbamoyl group, a carboxy group and a sulfonyl group, with the proviso that $R_{10}$ and $R_{11}$ cannot simultaneously be hydrogen atoms or hydroxyl groups or a hydrogen atom and a hydroxyl group.

The present invention is directed to an ink jet recording method comprising ejecting an ink by an ink jet system to record an image, wherein the ink is the ink jet ink having the aforementioned constitution.

The present invention is directed to an ink cartridge having an ink storage portion for storing an ink provided therein, wherein the ink is the ink jet ink having the aforementioned constitution.

The present invention is directed to a recording unit having an ink storage portion for storing an ink and a recording head for ejecting the ink provided therein, wherein the ink is the ink jet ink having the aforementioned constitution.

The present invention is directed to an ink jet recording apparatus having an ink storage portion for storing an ink and a recording head for ejecting an ink provided therein, wherein the ink is the ink jet ink having the aforementioned constitution.

The present invention provides an ink jet ink, which gives a superior lightfastness to an image recorded by using the ink, and has a superior sticking resistance and intermittent ejection stability of an ink. Another embodiment of the present invention provides an ink jet ink, which shows superior recording durability even when being applied to an ink jet recording system for ejecting the ink by using an action of thermal energy, and has a color tone preferable as a black ink. The present invention also provides an ink jet recording method, an ink cartridge, a recording unit, and an ink jet recording apparatus which can stably provide an image that has superior lightfastness by using the above described ink jet ink.

Further features of the present invention will become apparent from the following description of exemplary embodiments with reference to the attached drawings.

DESCRIPTION OF THE EMBODIMENTS

Figure 1:
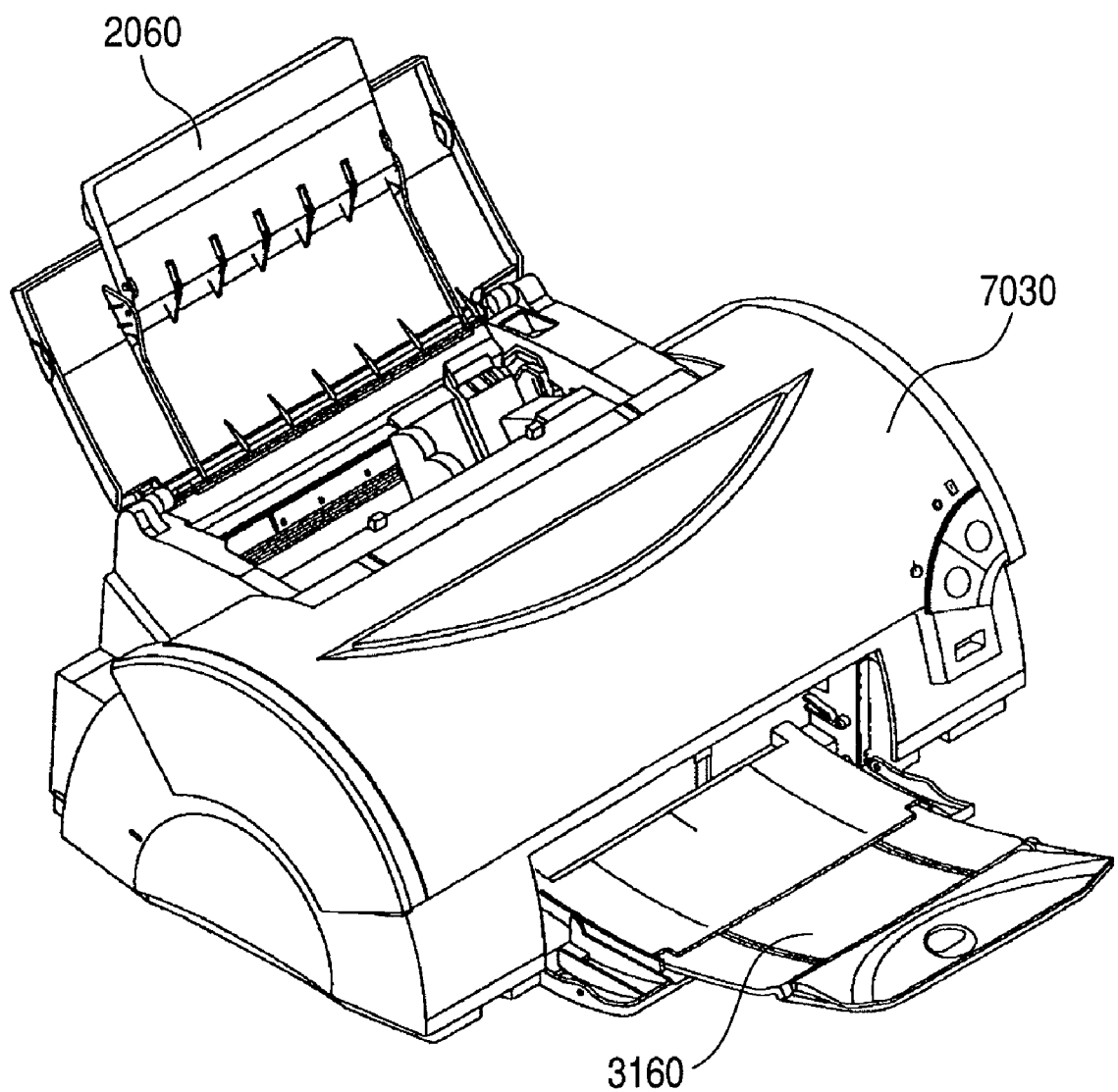
FIG. 1 is a perspective view of an ink jet recording apparatus.

The present invention will now be described in detail below with reference to exemplary embodiments. In the present invention, when a compound to be used is a salt, an expression of "salt is contained" is used for convenience, though at least a part of the salt is dissociated to be an ion in an ink. In addition, compounds represented by general formulas (I) to (IV) are occasionally described as "compound of general formula (I)", "compound of general formula (II)", "compound of general formula (III)" and "compound of general formula (IV)", respectively.

<Ink>

Components of an ink jet ink of the present invention, (which may be referred to simply as ink, hereinafter), and physical properties of the ink will now be described in detail below.

As a result of having made an investigation, the present inventors obtained a knowledge that an image recorded by using an ink having a composition containing a particular azo-based dye together with a particular compound shows superior lightfastness, and also has superior sticking resistance and intermittent ejection stability. The present invention has been designed on the basis of such a knowledge. One feature of the present invention is that the ink is prepared by using an azo-based dye represented by general formula (I) together with a particular compound represented by general formula (II). These compounds will now be described below.

(Compound Represented by General formula (I))

An ink according to the present invention needs to contain, as a coloring material, a compound represented by the following general formula (I):

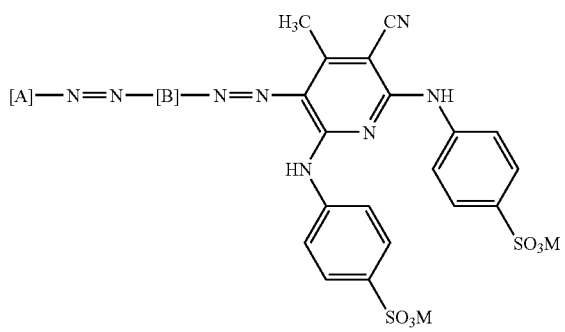

General formula (I)

wherein, in general formula (I), [A] represents an optionally substituted aromatic group or heterocyclic group; —[B]— represents a group represented by any one of the following general formulas (1) to (5); and M represents each independently any one of a hydrogen atom, an alkaline metal, ammonium and an organic ammonium,

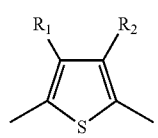

General formula (1)

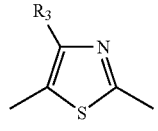

General formula (2)

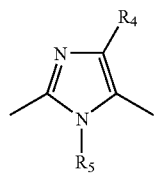

General formula (3)

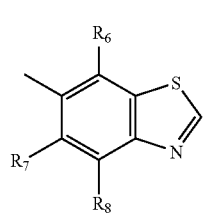

General formula (4)

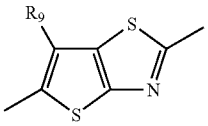

General formula (5)

wherein, in general formulas (1) to (5), $R_1$ to $R_9$ represent each independently any one of a hydrogen atom, a halogen atom and a substituent selected from the following group of the substituents. The group of the substituents includes an aliphatic group, an aromatic group, a heterocyclic group, a carboxy group, a carbamoyl group, an alkoxycarbonyl group, an aryloxycarbonyl group, a heterocyclic oxycarbonyl group, an acyl group and a hydroxyl group; an alkoxy group, an aryloxy group, a heterocyclic oxy group, a silyloxy group, an acyloxy group, a carbamoyloxy group, an alkoxycarbonyloxy group and an aryloxycarbonyloxy group; an amino group, an acylamino group, an ureido group, a sulfamoyl amino group, an alkoxycarbonyl amino group, an aryloxycarbonyl amino group, an alkylsulfonylamino or arylsulfonylamino group and a heterocyclic sulfonylamino group; and a cyano group, a nitro group, an alkylthio or arylthio group, a heterocyclic thio group, an alkylsulfonyl or arylsulfonyl group, a heterocyclic sulfonyl group, an alkylsulfinyl or arylsulfinyl group, a heterocyclic sulfinyl group, a sulfamoyl group and a sulfonate group. Each of the above described groups is optionally substituted).

[A] in general formula (I) represents an optionally substituted aromatic group or heterocyclic group, and specifically can include the following groups: a benzene ring, a naphthalene ring, a pyridine ring, an imidazole ring, a pyrazole ring, a thiazole ring, an isothiazole ring, a thiadiazole ring, a benzothiazole ring and a benzoisothiazole ring. Among the above described rings, the benzene ring, the naphthalene ring, the pyridine ring, the pyrazole ring, the imidazole ring, the isothiazole ring or the benzothiazole ring can be used. Further among them, the benzene ring or the naphthalene ring can be used.

—[B]— in general formula (I) represents a group represented by any one of the above described general formulas (1) to (5). $R_1$ to $R_9$ in the above described general formulas (1) to (5) represent each independently any one of a hydrogen atom, a halogen atom and a substituent selected from the previously described group of the substituents. A halogen atom and each of the groups, which can be selected as $R_1$ to $R_9$, will now be further specifically described below.

The halogen atom includes a chlorine atom, a bromine atom and an iodine atom. Among the above atoms, a chlorine atom or a bromine atom can be employed. Particularly, the chlorine atom can be employed.

The aliphatic group includes an alkyl group, a substituted alkyl group, an alkenyl group, a substituted alkenyl group, an alkynyl group, a substituted alkynyl group, an aralkyl group and a substituted aralkyl group. These aliphatic groups may have a branch, and may form a ring. The aliphatic group can have 1 to 20 carbon atoms, and can further have 1 to 16 carbon atoms. The aryl portion in the aralkyl group and the substituted aralkyl group can be phenyl or naphthyl, and can further be phenyl. Specific examples of the aliphatic group can include the following groups: a methyl group, an ethyl group, a butyl group, an isopropyl group and a t-butyl group. The specific examples can also include a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The aromatic group includes an aryl group having a monovalent or divalent substituent and an unsubstituted aryl group. A monovalent aromatic group includes an aryl group having a substituent and an unsubstituted aryl group. The aryl group can be phenyl or naphthyl, and can further be phenyl. The monovalent aromatic group can have 6 to 20 carbon atoms, and can further have 6 to 16 carbon atoms. Specific examples of the monovalent aromatic group can include a phenyl group, a p-tolyl group, a p-methoxyphenyl group, an o-chlorophenyl group and an m-(3-sulfopropylamino)phenyl group. Specific examples of the divalent aromatic group can include an aromatic group in which the valency of the monovalent aromatic groups is changed into divalence. The specific examples include, for instance, a phenylene group, a p-tolylene group, a p-methoxyphenylene group, an o-chlorophenylene group and an m-(3-sulfopropylamino)phenylene group and a naphthylene group.

The heterocyclic group includes a heterocyclic group having a substituent and an unsubstituted heterocyclic group. The heterocyclic ring may be condensed with an aliphatic ring, an aromatic ring or another heterocyclic ring. The heterocyclic group can include a five-membered or six-membered heterocyclic group. A hetero atom of the heterocyclic ring includes a nitrogen atom, an oxygen atom and a sulfur atom. Specific examples of the substituent can include an aliphatic group, a halogen atom, an alkylsulfonyl or arylsulfonyl group, an acyl group, an acylamino group, a sulfamoyl group, a carbamoyl group and an ionic hydrophilic group. Specific examples of the monovalent heterocyclic group include a 2-pyridyl group, a 3-pyridyl group, a 2-thienyl group, a 2-thiazolyl group, a 2-benzothiazolyl, a 2-benzoxazolyl group and a 2-furyl group. Specific examples of the divalent heterocyclic group include each group in which a hydrogen atom in the above described monovalent heterocyclic group is removed to make the site as a coupling site.

The carbamoyl group includes a carbamoyl group having a substituent and an unsubstituted carbamoyl group. A specific example of the substituent can include an alkyl group. Specific examples of the carbamoyl group can include a methylcarbamoyl group and a dimethylcarbamoyl group.

The alkoxycarbonyl group includes an alkoxycarbonyl group having a substituent and an unsubstituted alkoxycarbonyl group. The alkoxycarbonyl group can have 2 to 20 carbon atoms. A specific example of the substituent can include an ionic hydrophilic group. Specific examples of the alkoxycarbonyl group can include a methoxycarbonyl group and an ethoxycarbonyl group.

The aryloxycarbonyl group includes an aryloxycarbonyl group having a substituent and an unsubstituted aryloxycarbonyl group. The aryloxycarbonyl group can have 7 to 20 carbon atoms. A specific example of the substituent can include an ionic hydrophilic group. A specific example of the aryloxycarbonyl group can include a phenoxycarbonyl group.

The heterocyclic oxycarbonyl group includes a heterocyclic oxycarbonyl group having a substituent and an unsubstituted heterocyclic oxycarbonyl group. The heterocyclic oxycarbonyl group can have 2 to 20 carbon atoms. A specific example of the substituent can include an ionic hydrophilic group. A specific example of the heterocyclic oxycarbonyl group can include a 2-pyridyloxycarbonyl group.

The acyl group includes an acyl group having a substituent and an unsubstituted acyl group. The acyl group can have 1 to 20 carbon atoms. A specific example of the substituent can include an ionic hydrophilic group. Specific examples of the acyl group include an acetyl group and a benzoyl group.

The alkoxy group includes an alkoxy group having a substituent and an unsubstituted alkoxy group. The alkoxy group can have 1 to 20 carbon atoms. Specific examples of the substituent can include an alkoxy group, a hydroxyl group and an ionic hydrophilic group. Specific examples of the alkoxy group include a methoxy group, an ethoxy group, an isopropoxy group, a methoxyethoxy group, a hydroxyethoxy group and a 3-carboxypropoxy group.

The aryloxy group includes an aryloxy group having a substituent and an unsubstituted aryloxy group. The aryloxy group can have 6 to 20 carbon atoms. Specific examples of the substituent can include an alkoxy group and an ionic hydrophilic group. Specific examples of the aryloxy group include a phenoxy group, a p-methoxyphenoxy group and an o-methoxyphenoxy group.

The heterocyclic oxy group includes a heterocyclic oxy group having a substituent and an unsubstituted heterocyclic oxy group. The heterocyclic oxy group can have 2 to 20 carbon atoms. Specific examples of the substituent can include an alkyl group, an alkoxy group and an ionic hydrophilic group. Specific examples of the heterocyclic oxy group include a 3-pyridyloxy group and a 3-thienyloxy group.

The silyloxy group can include a silyloxy group, which has 1 to 20 carbon atoms, which is substituted with an aliphatic group or an aromatic group. Specific examples of the silyloxy group include a trimethylsilyloxy group and a diphenylmethylsilyloxy group.

The acyloxy group includes an acyloxy group having a substituent and an unsubstituted acyloxy group. The acyloxy group can have 1 to 20 carbon atoms. A specific example of the substituent can include an ionic hydrophilic group. Specific examples of the acyloxy group include an acetoxy group and a benzoyloxy group.

The carbamoyloxy group includes a carbamoyloxy group having a substituent and an unsubstituted carbamoyloxy group. A specific example of the substituent can include an alkyl group. A specific example of the carbamoyloxy group includes an N-methylcarbamoyloxy group.

The alkoxycarbonyloxy group includes an alkoxycarbonyloxy group having a substituent and an unsubstituted alkoxycarbonyloxy group. The alkoxycarbonyloxy group can have 2 to 20 carbon atoms. Specific examples of the alkoxycarbonyloxy group include a methoxycarbonyloxy group and an isopropoxycarbonyloxy group.

The aryloxycarbonyloxy group includes an aryloxycarbonyloxy group having a substituent and an unsubstituted aryloxycarbonyloxy group. The aryloxycarbonyloxy group can have 7 to 20 carbon atoms. A specific example of the aryloxycarbonyloxy group includes a phenoxycarbonyloxy group.

The amino group includes an amino group which is substituted with an alkyl group, an aryl group or a heterocyclic group. The alkyl group, the aryl group and the heterocyclic group may further have a substituent. The alkylamino group can have 1 to 20 carbon atoms. A specific example of the substituent can include an ionic hydrophilic group. Specific examples of the alkylamino group include a methylamino group and a diethylamino group. The arylamino group includes an arylamino group having a substituent and an unsubstituted arylamino group. The arylamino group can have 6 to 20 carbon atoms. Specific examples of the substituent can include a halogen atom and an ionic hydrophilic group. Specific examples of the arylamino group include an anilino group and a 2-chlorophenylamino group. The heterocyclic amino group includes a heterocyclic amino group having a substituent and an unsubstituted heterocyclic amino group. The heterocyclic amino group can have 2 to 20 carbon atoms. Specific examples of the substituent can include an alkyl group, a halogen atom and an ionic hydrophilic group.

The acylamino group includes an acylamino group having a substituent and an unsubstituted acylamino group. The acylamino group can have 2 to 20 carbon atoms. A specific example of the substituent can include an ionic hydrophilic group. Specific examples of the acylamino group include an acetylamino group, a propionylamino group, a benzoylamino group, an N-phenylacetylamino group and a 3,5-disulfobenzoylamino group.

The ureido group includes an ureido group having a substituent and an unsubstituted ureido group. The ureido group can have 1 to 20 carbon atoms. Specific examples of the substituent can include an alkyl group and an aryl group. Specific examples of the ureido group include a 3-methylureido group, a 3,3-dimethylureido group and a 3-phenylureido group.

The sulfamoylamino group includes a sulfamoylamino group having a substituent and an unsubstituted sulfamoylamino group. A specific example of the substituent can include an alkyl group. A specific example of the sulfamoylamino group includes an N,N-dipropyl sulfamoylamino group.

The alkoxycarbonylamino group includes an alkoxycarbonylamino group having a substituent and an unsubstituted alkoxycarbonylamino group. The alkoxycarbonylamino group can have 2 to 20 carbon atoms. A specific example of the substituent can include an ionic hydrophilic group. A specific example of the alkoxycarbonylamino group includes an ethoxycarbonylamino group.

The aryloxycarbonylamino group includes an aryloxycarbonylamino group having a substituent and an unsubstituted aryloxycarbonylamino group. The aryloxycarbonylamino group can have 7 to 20 carbon atoms. A specific example of the substituent can include an ionic hydrophilic group. A specific example of the aryloxycarbonyl amino group includes a phenoxycarbonylamino group.

The alkylsulfonylamino or arylsulfonylamino group includes an alkylsulfonylamino or arylsulfonylamino group having a substituent, and an unsubstituted alkylsulfonylamino or arylsulfonylamino group. The sulfonylamino group can have 1 to 20 carbon atoms. A specific example of the substituent can include an ionic hydrophilic group. Specific examples of the sulfonylamino group include a methylsulfonylamino group, an N-phenyl-methylsulfonylamino group, a phenylsulfonylamino group and a 3-carboxyphenylsulfonylamino group.

The heterocyclic sulfonylamino group includes a heterocyclic sulfonylamino group having a substituent and an unsubstituted heterocyclic sulfonylamino group. The heterocyclic sulfonylamino group can have 1 to 12 carbon atoms. A specific example of the substituent can include an ionic hydrophilic group. Specific examples of the heterocyclic sulfonylamino group include a 2-thiophenesulfonylamino group and a 3-pyridinesulfonylamino group.

The alkylthio or arylthio group includes an alkylthio or arylthio group having a substituent, and an unsubstituted alkylthio or arylthio group. The alkylthio or arylthio group can have 1 to 20 carbon atoms. A specific example of the substituent can include an ionic hydrophilic group. Specific examples of the alkylthio or arylthio group include a methylthio group and a phenylthio group.

The heterocyclic thio group includes a heterocyclic thio group having a substituent and an unsubstituted heterocyclic thio group. The heterocyclic thio group can have 1 to 20 carbon atoms. A specific example of the substituent can include an ionic hydrophilic group. A specific example of the heterocyclic thio group includes a 2-pyridylthio group.

The alkylsulfonyl or arylsulfonyl group includes an alkylsulfonyl or arylsulfonyl group having a substituent, and an unsubstituted alkylsulfonyl or arylsulfonyl group. Specific examples of the alkylsulfonyl or arylsulfonyl group include a methylsulfonyl group and a phenylsulfonyl group.

The heterocyclic sulfonyl group includes a heterocyclic sulfonyl group having a substituent and an unsubstituted heterocyclic sulfonyl group. The heterocyclic sulfonyl group can have 1 to 20 carbon atoms. A specific example of the substituent can include an ionic hydrophilic group. Specific examples of the heterocyclic sulfonyl group include a 2-thiophenesulfonyl group and a 3-pyridinesulfonyl group.

The alkylsulfinyl or arylsulfinyl group includes an alkylsulfinyl or arylsulfinyl group having a substituent, and an unsubstituted alkylsulfinyl or arylsulfinyl group. Specific examples of the alkylsulfinyl or arylsulfinyl group include a methylsulfinyl group and a phenylsulfinyl group.

The heterocyclic sulfinyl group includes a heterocyclic sulfinyl group having a substituent and an unsubstituted heterocyclic sulfinyl group. The heterocyclic sulfinyl group can have 1 to 20 carbon atoms. A specific example of the substituent can include an ionic hydrophilic group. A specific example of the heterocyclic sulfinyl group includes a 4-pyridinesulfinyl group.

The sulfamoyl group includes a sulfamoyl group having a substituent and an unsubstituted sulfamoyl group. A specific example of the substituent can include an alkyl group. Specific examples of the sulfamoyl group include a dimethylsulfamoyl group and a di-(2-hydroxyethyl)sulfamoyl group.

M in general formula (I) each independently represents any one of a hydrogen atom, an alkaline metal, ammonium and an organic ammonium. Specific examples of the above described alkaline metal include lithium, sodium and potassium. Specific examples of the above described organic ammonium include acetamido, benzamido, methylamino, butylamino, diethylamino, phenylamino and triethanolamino.

A compound of general formula (I) to be used in the present invention can have a structure in which [A] represents an optionally substituted naphthyl group, —[B]— represents a group represented by the above described general formula (2), and $R_3$ represented by general formula (2) represents an aryl group. In this case, specific examples of the aryl group can include: a phenyl group, a 2-methylphenyl group, a 3-methylphenyl group and a 4-methylphenyl group; a 2,3-dimethylphenyl group, a 2,4-dimethylphenyl group, a 2,5-dimethylphenyl group, a 3,4-dimethylphenyl group, a 2,6-dimethylphenyl group and a 3,5-dimethylphenyl group, a 2,4,6-trimethylphenyl group, a 2,3,4-trimethylphenyl group, a 2,3,5-trimethylphenyl group, a 2,3,6-trimethylphenyl group, a 2-chlorophenyl group, a 3-chlorophenyl group and a 4-chlorophenyl group, a 2-ethylphenyl group, a 3-ethylphenyl group and a 4-ethylphenyl group. In this case, the aryl group may also be a pyridyl group or a naphthyl group. Specific examples of the pyridyl group or a naphthyl group can include: a 2-pyridyl group, a 3-pyridyl group, a 4-pyridyl group, a 1-naphthyl group and a 2-naphthyl group. Among the above described groups, the phenyl group, the 3-methylphenyl group, the 4-methylphenyl group, the 2-chlorophenyl group, the 3-chlorophenyl group, the 2-pyridyl group, the 4-pyridyl group, the 1-naphthyl group and the 2-naphthyl group can be used.

Among the above described structures, a compound of the above described general formula (I) to be used in the present invention can show an absorption spectrum having the maximum absorption wavelength ($\lambda_{max}$) of 590 nm or longer to 620 nm or shorter, when the absorption spectrum is measured by using water as a solvent for the compound.

Specific examples of the compound of the above described general formula (I) can include the following exemplified compounds I-1 to I-12. By the way, a compound contained in an ink according to the present invention is not limited to the following exemplified compounds as long as the compound is included in the structure of the above described general formula (I). Among the following exemplified compounds, the exemplified compounds I-3, I-5, I-6, I-8, I-9, I-10, I-11 and I-12 can be particularly used, and exemplified compounds I-3, I-5 and I-10 can be more particularly used as the compound contained in the ink according to the present invention.

Exemplified compound I-1

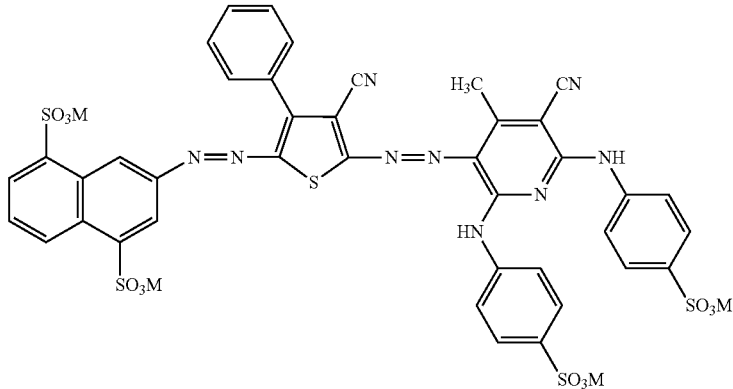

Exemplified compound I-2

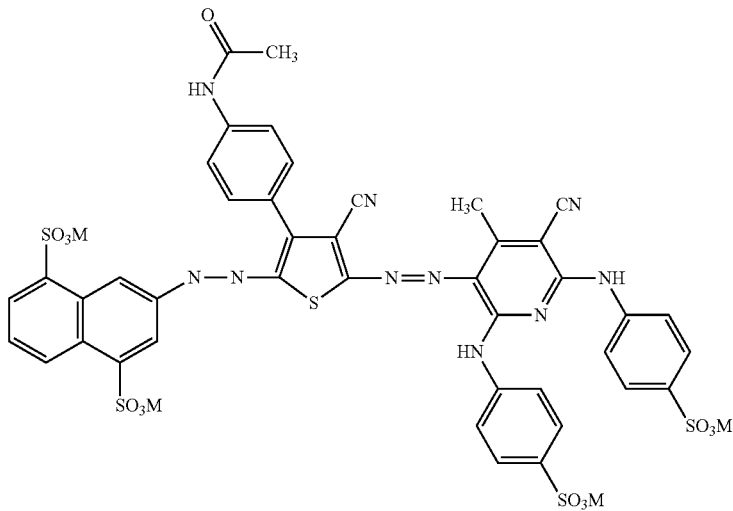

Exemplified compound I-3

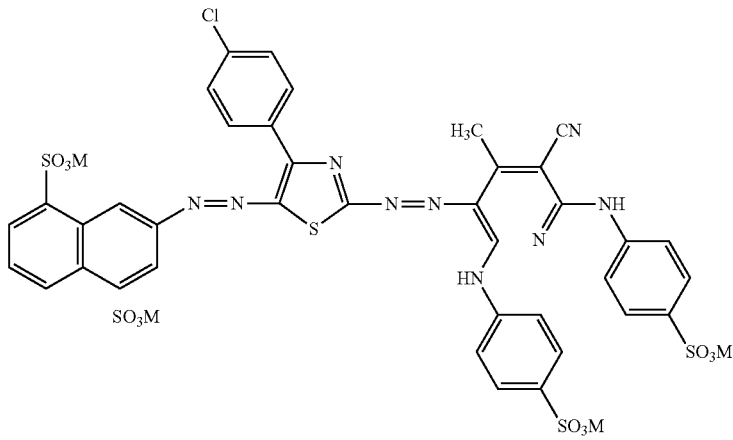

-continued
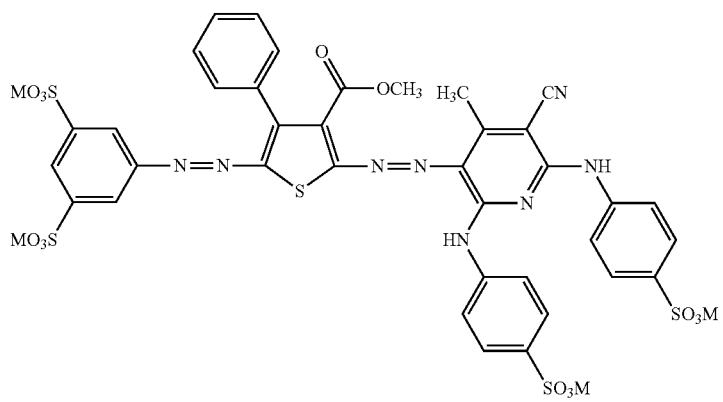
Exemplified compound I-4
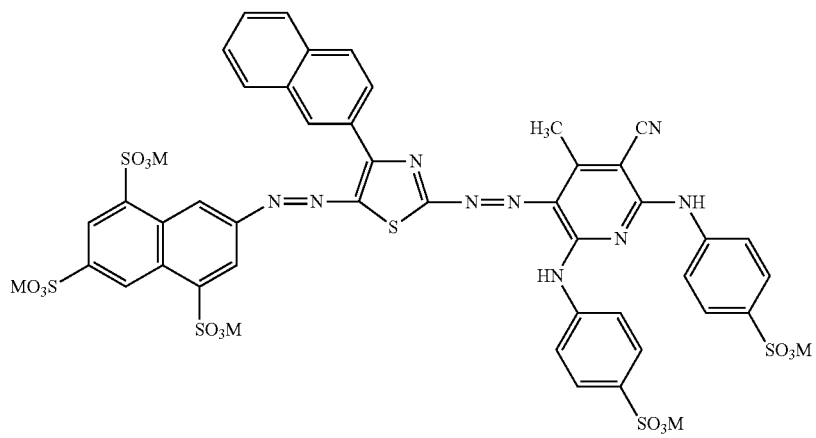
Exemplified compound I-5
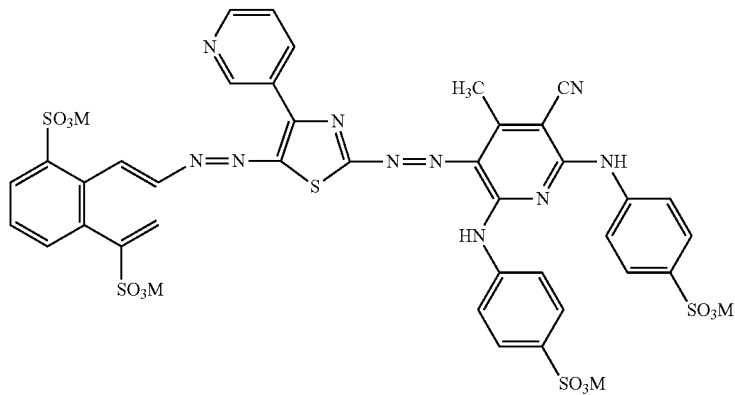
Exemplified compound I-6
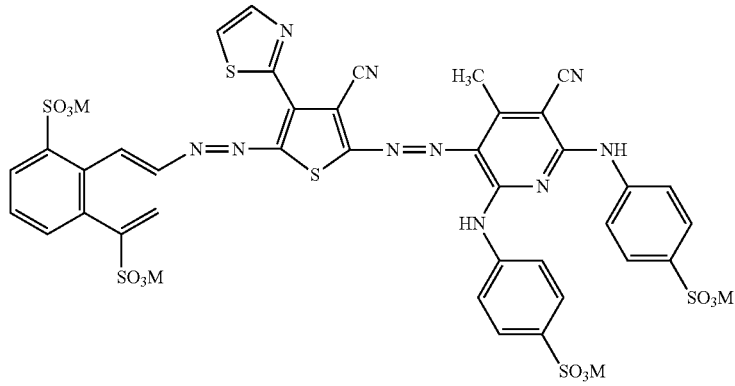
Exemplified compound I-7

-continued
Exemplified compound I-8
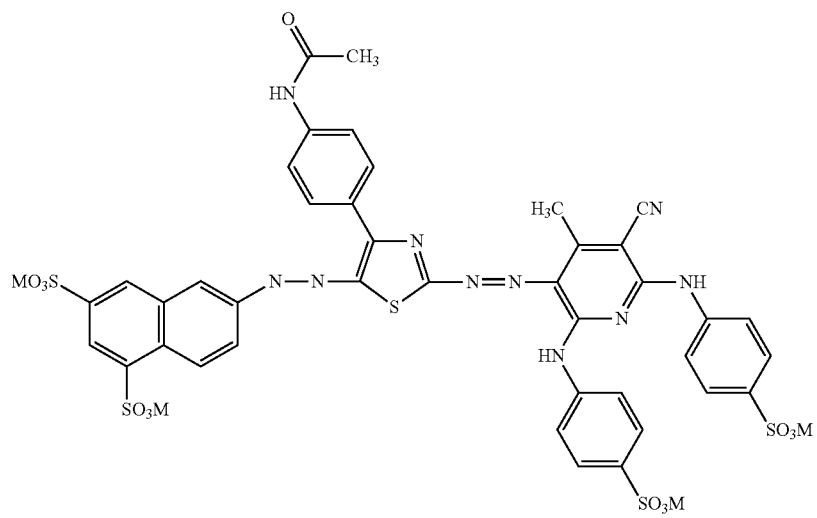
Exemplified compound I-9
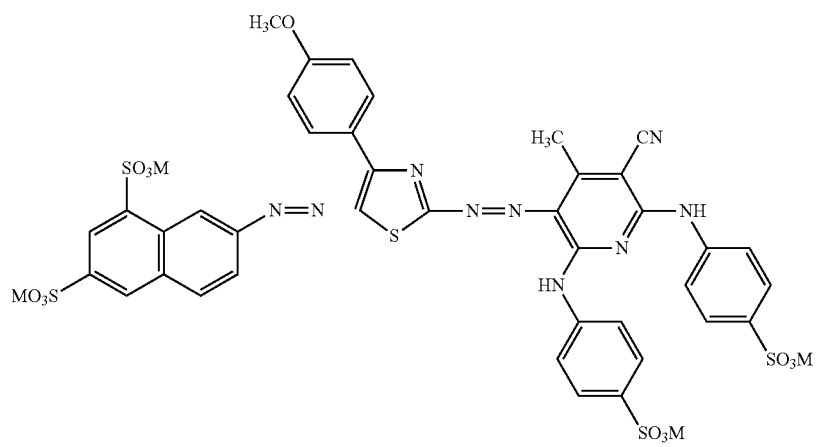
Exemplified compound I-10
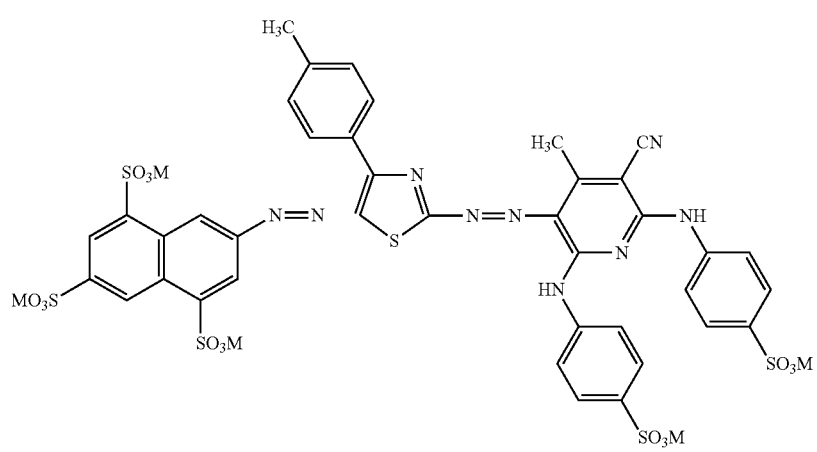

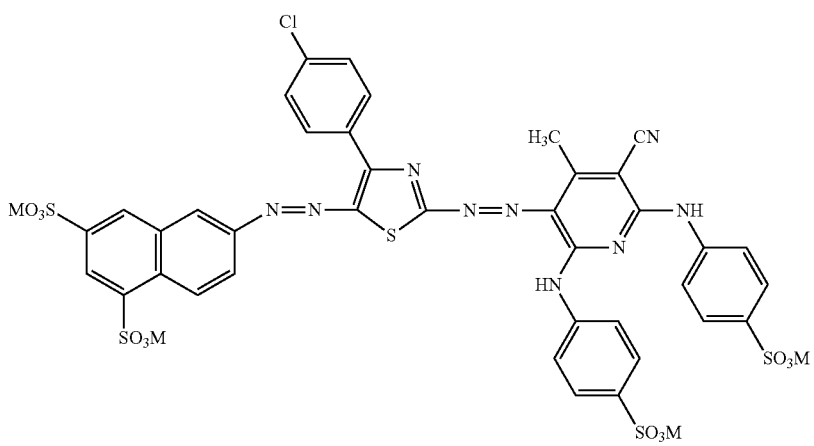

Exemplified compound I-11

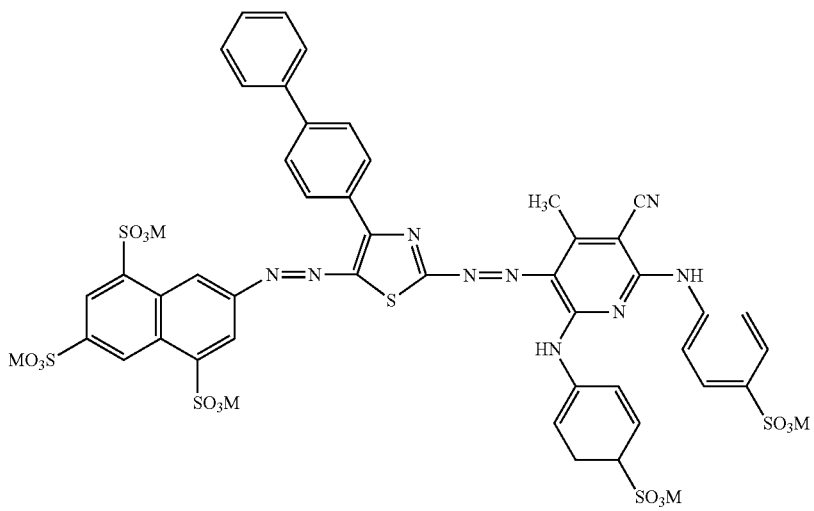

Exemplified compound I-12

(Compound Represented by General Formula (II))

As was described above, the present inventors made various investigations on the formulation of the ink, in order to further enhance the lightfastness of an image recorded by using an ink containing the compound of the above described general formula (I). Specifically, the present inventors made an investigation on enhancing the fastness properties of the image recorded by using the ink containing the compound of the above described general formula (I), by using a compound which is conventionally known to enhance the fastness properties of the image. However, it was found that when such a compound is used together with the compound of the above described general formula (I), the ink causes another problem of decreasing its sticking resistance and intermittent ejection stability.

Then, the present inventors made an investigation on a wide variety of materials including various water-soluble organic solvents and compounds, for a compound to be used together with the compound of the above described general formula (I). As a result, the present inventors obtained a knowledge that the image recorded by using the ink can show a dramatically enhanced lightfastness, which contains a compound of the following general formula (II) together with the compound of the above described general formula (I). The present inventors further obtained a knowledge that the ink enhances its sticking resistance and intermittent ejection stability when using the compound of the following general formula (II), and that the superior reliability of the ink and the lightfastness of the image can be balanced at a high level.

$$R_{10}\text{—}[C]\text{—}R_{11} \quad \text{General formula (II)}$$

In general formula (II), —[C]— represents —S—, —S(=O)— or, —S(=O)$_2$—; and $R_{10}$ and $R_{11}$ each independently represent any one of a hydrogen atom, a hydroxyl group, an alkyl group, a hydroxyalkyl group, an alkenyl group, an acyl group, a carbamoyl group, a carboxy group and a sulfonyl group, with the proviso that $R_{10}$ and $R_{11}$ cannot simultaneously be hydrogen atoms or hydroxyl groups or a hydrogen atom and a hydroxyl group.

$R_{10}$ and $R_{11}$ in general formula (II) represent each independently any one of a hydrogen atom, a hydroxyl group, an alkyl group, a hydroxyalkyl group, an alkenyl group, an acyl group, a carbamoyl group, a carboxy group and a sulfonyl group. The alkyl group can have 1 to 4 carbon atoms. Specifically, the alkyl group includes a methyl group, an ethyl group, an n-propyl group, an iso-propyl group, an n-butyl group, a sec-butyl group, a t-butyl group and an iso-butyl group. The above described hydroxyalkyl group includes a hydroxymethyl group, a hydroxyethyl group, a hydroxypropyl group and a hydroxybutyl group. The above described acyl group includes an acetyl group and a benzoyl group. The above described carbamoyl group includes a methylcarbamoyl group and a dimethylcarbamoyl group.

In the present invention, the description of "$R_{10}$ and $R_{11}$ cannot simultaneously be hydrogen atoms or hydroxyl groups or a hydrogen atom and a hydroxyl group" in the above described general formula (II) means that $R_{10}$ and $R_{11}$ in general formula (II) do not include the following cases: both $R_{10}$ and $R_{11}$ are hydrogen atoms; both $R_{10}$ and $R_{11}$ are hydroxyl groups; and one of $R_{10}$ and $R_{11}$ is a hydrogen atom, and the other is a hydroxyl group.

The mechanism through which the image recorded by using an ink containing the compounds of general formula (I) and (II) shows the enhanced lightfastness is not clear in detail, but the present inventors assume the reason in the following way. The compound of general formula (I) has at least 2 sulfonate groups which are strong electron-attracting groups. For this reason, the compound of general formula (II) has a function of protecting the compound of general formula (I) on the recording medium on which the ink has been applied, by making its polar group that is specifically a substituent combined with a sulfur atom, selectively adsorbed onto a portion having a low electron density in the compound of general formula (I). It is considered that the adsorption consequently inhibits the compound of general formula (I) from being decomposed by light, specifically, an ultraviolet energy to enhance the lightfastness of the image.

Specific examples of the compound of general formula (II) can include the following compounds: sulfine, a sulfinic acid, dimethylsulfine, dimethylsulfoxide, dimethylsulfone and (2-hydroxyethyl)methylsulfone. In addition, usable examples include thiodiglycol, bis(2-hydroxyethyl)sulfoxide, 1-(2-hydroxythylthio)-2-propanol and bis(2-hydroxyethyl)sulfone. In addition, a compound contained in an ink according to the present invention is not limited to the above described compounds as long as the compound is included in the structure of the above described general formula (II). In the present invention, among the above described compounds, bis(2-hydroxyethyl)sulfone can be particularly used.

The content (% by mass) of the compound of general formula (II) in the ink can be set at 1.0% by mass or more to 30.0% by mass or less with respect to the total mass of the ink. When the content of the compound of general formula (II) is less than 1.0% by mass, there is a case where the ink does not sufficiently provide an effect of enhancing the lightfastness of the image. On the other hand, when the content of the compound of general formula (II) exceeds 30.0% by mass, there is a case where the intermittent ejection stability is lowered.

(Glycerin)

The present inventors made a further investigation for making both the lightfastness of the image recorded by using an ink containing the compound of the above described general formula (I) compatible with the reliability of the ink at a higher level. As a result, the present inventors found that these performances can be achieved at a higher level and furthermore sticking recovery property is further enhanced by using glycerin in addition to the compound of the above described general formula (II) as a compound to be used together with the above described general formula (I). More specifically, when glycerin is used together with the compounds, the content (% by mass) of glycerin in an ink can be set at 1.0% by mass or more to 20.0% by mass or less with respect to the total mass of the ink. When the content of glycerin is less than 1.0% by mass, there is a case where glycerin does not sufficiently provide the effect of enhancing the sticking resistance. On the other hand, when the content of glycerin exceeds 20.0% by mass, there is a case where glycerin does not sufficiently provide the effect of enhancing the intermittent ejection stability.

In addition, the present inventors found that when the compound of the above described general formula (II) and glycerin are used together with the compound of general formula (I), the total content of the compound of general formula (II) and glycerin can be set at the following range. In other words, when the content is adjusted to the following values, the lightfastness of the image can be compatible with the sticking resistance of the ink at a high level, and further the intermittent ejection stability can also be enhanced. Specifically, the total content (% by mass) of the compound of general formula (II) and glycerin can be set at 8.0% by mass or more to 23.0% by mass or less with respect to the total mass of the ink. Contrary to this, when the above described total content of the compound does not satisfy the above described range, there is a case where the compounds do not sufficiently provide the effect of enhancing the intermittent ejection stability.

In addition, the present inventors found that a further effect is obtained by setting the mass ratio of the content of the compound of general formula (II) to the content of glycerin in an ink at a particular range. In other words, it was found that the sticking resistance and the intermittent ejection stability are further enhanced by setting the mass ratio at the range, and further that the ink more effectively inhibits a break in a heater in a recording head even when being applied to an ink jet recording system which ejects the ink by using an action of thermal energy. Specifically, the mass ratio of the content (% by mass) of the compound of general formula (II) to the content (% by mass) of glycerin with respect to the total mass of the ink, namely, the value (content of compound of general formula (II)/content of glycerin) can be set at 0.40 or more to 5.90 or less. On the contrary, when the above described mass ratio is less than 0.40, there is a case where the ink does not show the effect of enhancing the sticking resistance and intermittent ejection stability. On the other hand, when the above described mass ratio exceeds 5.90, there is a case where the wire of the heater in the recording head is broken when an ink is applied to the ink jet recording system which ejects the ink by using an action of thermal energy, and when the predetermined number of electrical pulses are applied to the recording head. Specifically, there is a case where the recording durability is lowered.

(Compound Represented by General Formula (III) and Compound Represented by General Formula (IV))

(Compound represented by General Formula (III))

An image recorded by using a black ink can particularly present a color tone which is closer to a neutral. An ink according to the present invention contains the compound of the above described general formula (I) as a coloring material, and can provide an image having a neutral color tone, by using the compound of the following general formula (III) which is an azo-based dye and the compound of the following general formula (IV), in addition to the coloring material.

General formula (III)

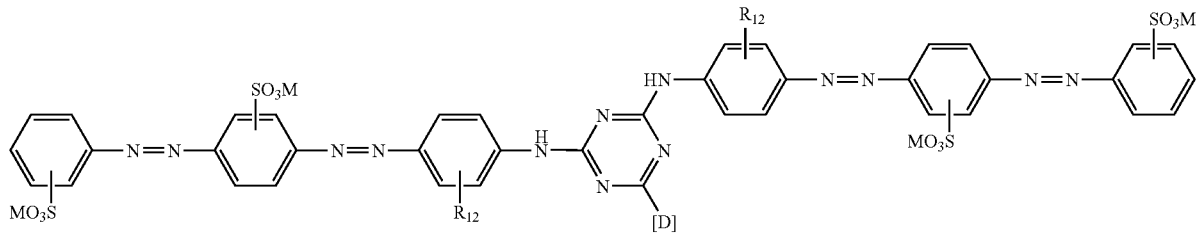

In general formula (III), $R_{12}$ represents each independently any one of a hydrogen atom, a halogen atom and a substituent selected from the following group of substituents. The group of the substituents includes: a hydroxyl group, a carboxy group, and an alkyl group having 1 to 4 carbon atoms, which is optionally substituted with a hydroxyl group or an alkoxy group having 1 to 4 carbon atoms; an alkoxy group having 1 to 4 carbon atoms, which is optionally substituted with a hydroxyl group or an alkoxy group having 1 to 4 carbon atoms; an alkylamino group having 1 to 4 carbon atoms, which is optionally substituted with a hydroxyl group or an alkoxy group having 1 to 4 carbon atoms; a carboxy-alkylamino group in which the alkyl has 1 to 5 carbon atoms and a bis-[carboxy-alkyl]amino group in which the alkyl has 1 to 5 carbon atoms; an alkanoylamino group having 1 to 4 carbon atoms, which is optionally substituted with a hydroxyl group or an alkoxy group having 1 to 4 carbon atoms; and a phenylamino group which is optionally substituted with a carboxy group, a sulfonate group or an amino group, a sulfonate group and an ureido group. [D] in the formula represents an aliphatic amine residue having a carboxy group or a sulfonate group. M represents each independently any one of a hydrogen atom, an alkaline metal, ammonium and an organic ammonium.

$R_{12}$ in general formula (III) represents each independently any one of a hydrogen atom, a halogen atom and a substituent selected from the above described groups of the substituents. Each of the substituents and a halogen atom, which can be selected as $R_{12}$, will now be described in detail below.

Specific examples of an alkyl group having 1 to 4 carbon atoms, which is optionally substituted with a hydroxyl group or an alkoxy group having 1 to 4 carbon atoms, can include the following respective substituents: a methyl group, an ethyl group, an n-propyl group, an isopropyl group, an n-butyl group, an isobutyl group, a sec-butyl group and a tert-butyl group; and a methoxyethyl group, an ethoxyethyl group, an n-propoxyethyl group, an isopropoxyethyl group, an n-butoxyethyl group, a sec-butoxyethyl group, a tert-butoxyethyl group and a 2-hydroxyethyl group.

Specific examples of the alkoxy group having 1 to 4 carbon atoms, which is optionally substituted with a hydroxyl group or an alkoxy group having 1 to 4 carbon atoms, can include: a methoxy group, an ethoxy group, an n-propoxy group, an isopropoxy group, an n-butoxy group, a sec-butoxy group, a tert-butoxy group, a 2-hydroxyethoxy group, a 2-hydroxypropoxy group and a 3-hydroxypropoxy group; a methoxyethoxy group, an ethoxyethoxy group, an n-propoxyethoxy group and an isopropoxyethoxy group; and an n-butoxyethoxy group, a methoxypropoxy group, an ethoxypropoxy group, an n-propoxypropoxy group, an isopropoxybutoxy group, an n-propoxybutoxy group and a 2-hydroxyethoxyethoxy group.

Specific examples of the alkylamino group having 1 to 4 carbon atoms, which is optionally substituted with a hydroxyl group or an alkoxy group having 1 to 4 carbon atoms, can include: a methylamino group, an ethylamino group, an n-propylamino group, an isopropylamino group, an n-butylamino group, an isobutylamino group, an N,N-dimethylamino group, an N,N-diethylamino group, an N,N-di(n-propyl)amino group and an N,N-di(isopropyl)amino group; a hydroxyethylamino group, a 2-hydroxypropylamino group, a 3-hydroxypropylamino group, a bis(hydroxyethyl)amino group, a methoxyethylamino group and an ethoxyethylamino group; and a bis(methoxyethyl)amino group and a bis(2-ethoxyethyl)amino group.

Specific examples of the carboxy-alkylamino group in which the alkyl has 1 to 5 carbon atoms include: a carboxymethylamino group, a carboxyethylamino group, a carboxypropylamino group, a carboxy-n-butylamino group and a carboxy-n-pentylamino group.

Specific examples of the bis-[carboxy-alkyl]amino group in which the alkyl has 1 to 5 carbon atoms include: a bis-(carboxymethyl)amino group, a bis-(carboxyethyl)amino group and a bis-(carboxypropyl)amino group.

Specific examples of the alkanoylamino group having 1 to 4 carbon atoms, which is optionally substituted with a hydroxyl group or an alkoxy group having 1 to 4 carbon atoms, can include: an acetylamino group, an n-propionylamino group, an isopropionylamino group, a hydroxyacetylamino group, a 2-hydroxy-n-propionylamino group, a 3-hydroxy-n-propionylamino group and a 2-methoxy-n-propionylamino group; and a 3-methoxy-n-propionylamino group, a 2-hydroxy-n-butyrylamino group, a 3-hydroxy-n-butyrylamino group, a 2-methoxy-n-butyrylamino group and a 3-methoxy-n-butyrylamino group.

Specific examples of the phenylamino group which is optionally substituted with a carboxy group, a sulfonate group or an amino group, can include: a phenylamino group, a sulphophenylamino group, a carboxyphenylamino group, a biscarboxyphenylamino group, an aminophenylamino group, a diaminophenylamino group and a diaminosulphophenylamino group.

The halogen atom includes a chlorine atom, a bromine atom and an iodine atom. Among the above atoms, the chlorine atom or the bromine atom can be employed. Particularly, the chlorine atom can be employed.

Specific examples of the ureido group can include a 3-methylureido group, a 3,3-dimethylureido group and a 3-phenylureido group.

[D] in general formula (III) represents an aliphatic amine residue having a carboxy group or a sulfonate group. The aliphatic amine residue can include a mono-alkylamine residue having 1 to 5 carbon atoms or a di-alkylamine residue having 1 to 5 carbon atoms, which have a carboxy group or a sulfonate group. Specific examples of the aliphatic amine residue having the carboxy group or the sulfonate group can include: an amino-alkylsulfonic acid having 1 to 5 carbon atoms, a diimino-alkylsulfonic acid having 1 to 5 carbon atoms, an amino-alkylcarboxylic acid having 1 to 5 carbon atoms and a diimino-alkylcarboxylic acid having 1 to 5 carbon atoms. Among the above acids, an aliphatic having 1 or 2 carbon atoms can be employed. The aliphatic amine residue having the carboxy group or the sulfonate group can include a sulfoethylamino group and a dicarboxymethylimino group, and can particularly include a sulfoethylamino group.

M in general formula (III) each independently represents any one of a hydrogen atom, an alkaline metal, ammonium and an organic ammonium. Specific examples of the above described alkaline metal include lithium, sodium and potassium. Specific examples of the above described organic ammonium include acetamido, benzamido, methylamino, butylamino, diethylamino, phenylamino and triethanolamino.

A compound of general formula (III) to be used in the present invention can have a structure in which $R_{12}$ can represent an alkyl group having 1 to 4 carbon atoms, and $R_{12}$ can represent particularly a methyl group.

Among the above described structures, a compound of the above described general formula (III) to be used in the present invention can show an absorption spectrum having the maximum absorption wavelength ($\lambda_{max}$) of 400 nm or longer to 440 nm or shorter, when the absorption spectrum is measured by using water as a solvent for the compound.

Specific examples of the compound of the above described general formula (III) can include the following exemplified compounds III-1 to III-12. The exemplified compounds III-1 to III-12 are compounds of which [D] in the following general formula (6) represents an aliphatic amine residue shown in the following Table 1 respectively. By the way, a compound contained in an ink according to the present invention is not limited to the following exemplified compounds as long as the compound is included in the structure of the above described general formula (III). In the present invention, among the following exemplified compounds, the exemplified compounds III-1, III-5 and III-9 can be particularly employed.

and an alkoxy group having 1 to 4 carbon atoms (the alkoxy group is optionally substituted with a hydroxyl group, an alkoxy group having 1 to 4 carbon atoms, a sulfonate group or a carboxy group); and an alkylsulfonyl group having 1 to 4 carbon atoms (the alkylsulfonyl group is optionally substituted with a hydroxyl group, a sulfonate group or a carboxy General formula (6)

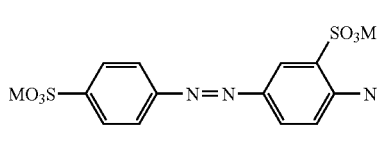

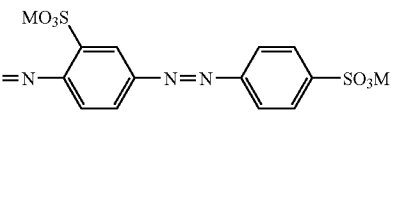

In general formula (6), M each independently represents any one of a hydrogen atom, an alkaline metal, ammonium and an organic ammonium.

TABLE 1

Compound represented by general formula (6)

| Exemplified compound | [D] in formula (6) |
|---|---|
| III-1 | $NH(CH_2)_2SO_3M$ |
| III-2 | $N((CH_2)_2COOM)_2$ |
| III-3 | $NH(CH_2)_2COOM$ |
| III-4 | $NH(CH_2)_5COOM$ |
| III-5 | $NHCH_2SO_3M$ |
| III-6 | $N(CH_2SO_3M)_2$ |
| III-7 | $N((CH_2)_2SO_3M)_2$ |
| III-8 | $NHCH_2COOM$ |
| III-9 | $N(CH_2COOM)_2$ |
| III-10 | $N((CH_2)_3COOM)_2$ |
| III-11 | $NH(CH_2)_3SO_3M$ |
| III-12 | $N((CH_2)_3SO_3M)_2$ |

(Compound represented by General Formula (IV))

General formula (IV)

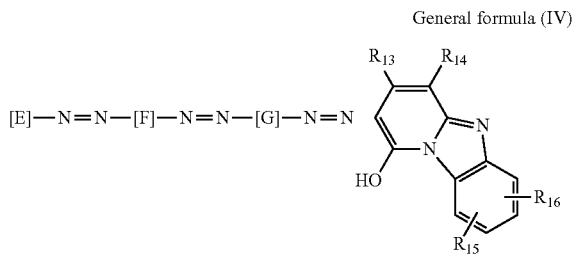

In general formula (IV), [E] represents a phenyl group having a substituent. The substituent is any one selected from the group of the following substituents. An atom or each of substituents constituting the group of the substituents includes: a carboxy group, a sulfonate group, a chlorine atom, a cyano group, a nitro group, a sulfamoyl group, and an alkyl group having 1 to 4 carbon atoms; an alkoxy group having 1 to 4 carbon atoms (the alkoxy group is optionally substituted with a hydroxyl group, an alkoxy group having 1 to 4 carbon atoms, a sulfonate group or a carboxy group); and an alkylsulfonyl group having 1 to 4 carbon atoms (the alkylsulfonyl group is optionally substituted with a hydroxyl group, a sulfonate group or a carboxy group). [F] and [G] each independently represent a para-phenylene group having a substituent. Each of substituents constituting the group of the substituents are selected from the following group. The respective function groups constituting the group include: a carboxy group, a sulfonate group, an alkyl group having 1 to 4 carbon atoms group). $R_{13}$ represents any one of an alkyl group having 1 to 4 carbon atoms, which is optionally substituted with a carboxy group, a phenyl group which is optionally substituted with a sulfonate group, and a carboxy group. $R_{14}$ represents any one of a cyano group, a carbamoyl group and a carboxy group. $R_{15}$ and $R_{16}$ each independently represent a hydrogen atom, a methyl group, a chlorine atom and a sulfonate group.

[E] in the above described general formula (IV) represents a substituted phenyl group, and the substituent is selected from the above described groups. Each of substituents which can be selected as a substituent of the phenyl group will now be described more specifically below.

Specific examples of the alkyl group having 1 to 4 carbon atoms include a methyl group, an ethyl group, an n-propyl group, an isopropyl group, an n-butyl group, an isobutyl group, a sec-butyl group and a tert-butyl group.

Specific examples of the alkoxy group having 1 to 4 carbon atoms, which is optionally substituted with a hydroxyl group, an alkoxy group having 1 to 4 carbon atoms, a sulfonate group or a carboxy group can include: a methoxy group, an ethoxy group, an n-propoxy group, an isopropoxy group, an n-butoxy group, a sec-butoxy group, a tert-butoxy group, a 2-hydroxyethoxy group, a 2-hydroxypropoxy group and a 3-hydroxypropoxy group; a methoxyethoxy group, an ethoxyethoxy group, an n-propoxyethoxy group, an isopropoxyethoxy group, an n-butoxyethoxy group, a methoxypropoxy group, an ethoxypropoxy group, an n-propoxypropoxy group, an isopropoxybutoxy group, an n-propoxybutoxy group; and a 2-hydroxyethoxyethoxy group, a carboxymethoxy group, a 2-carboxyethoxy group, a 3-carboxypropoxy group, a 2-sulfoethoxy group, a 3-sulfopropoxy group and a 4-sulfobutoxy group.

Specific examples of the alkylsulfonyl group having 1 to 4 carbon atoms, which is optionally substituted with a hydroxyl group, a sulfonate group or a carboxy group, can include: a methylsulfonyl group, an ethylsulfonyl group, a propylsulfonyl group, a butylsulfonyl group; and a hydroxyethylsulfonyl group, a 2-hydroxypropylsulfonyl group, a 2-sulfoethylsulfonyl group, a 3-sulfopropylsulfonyl group, a 2-carboxyethylsulfonyl group and a 3-carboxypropylsulfonyl group.

[F] and [G] in general formula (IV) each independently represent a substituted paraphenylene group having a substituent, and the substituent is selected from the following group. Each of substituents constituting the group of the substituents includes: a carboxy group, a sulfonate group, an alkyl group having 1 to 4 carbon atoms, an alkoxy group having 1 to 4 carbon atoms (the alkoxy group is optionally substituted with a hydroxyl group, an alkoxy group having 1 to 4 carbon atoms, a sulfonate group or a carboxy group); and an alkylsulfonyl group having 1 to 4 carbon atoms (the alkylsulfonyl group is optionally substituted with a hydroxyl group, a sulfonate group or a carboxy group).

Specific examples of the above described alkyl group having 1 to 4 carbon atoms include a methyl group, an ethyl group, an n-propyl group, an isopropyl group, an n-butyl group, an isobutyl group, a sec-butyl group and a tert-butyl group.

Specific examples of the alkoxy group having 1 to 4 carbon atoms, which is optionally substituted with a hydroxyl group, an alkoxy group having 1 to 4 carbon atoms, a sulfonate group or a carboxy group, can include: an ethoxy group, a methoxy group, an ethoxy group, an n-propoxy group, an isopropoxy group, an n-butoxy group, a sec-butoxy group, a tert-butoxy group, a 2-hydroxyethoxy group, a 2-hydroxypropoxy group and a 3-hydroxypropoxy group; a methoxyethoxy group, an ethoxyethoxy group, an n-propoxyethoxy group, an isopropoxyethoxy group, an n-butoxyethoxy group, a methoxypropoxy group, an ethoxypropoxy group, an n-propoxypropoxy group, an isopropoxybutoxy group, an n-propoxybutoxy group; and a 2-hydroxyethoxyethoxy group, a carboxymethoxy group, a 2-carboxyethoxy group, a 3-carboxypropoxy group, a 2-sulfoethoxy group, a 3-sulfopropoxy group and a 4-sulfobutoxy group.

Specific examples of the alkylsulfonyl group having 1 to 4 carbon atoms, which is optionally substituted with a hydroxyl group, a sulfonate group or a carboxy group, can include: a methylsulfonyl group, an ethylsulfonyl group, a propylsulfonyl group, a butylsulfonyl group, a hydroxyethylsulfonyl group, a 2-hydroxypropylsulfonyl group; and a 2-sulfoethylsulfonyl group, a 3-sulfopropylsulfonyl group, a 2-carboxyethylsulfonyl group and a 3-carboxypropylsulfonyl group.

$R_{13}$ in general formula (IV) represents any one of an alkyl group having 1 to 4 carbon atoms, which is optionally substituted with a carboxy group, a phenyl group which is optionally substituted with a sulfonate group, and a carboxy group.

Specific examples of the alkyl group having 1 to 4 carbon atoms, which is optionally substituted with a carboxy group, can include: a methyl group, an ethyl group, an n-propyl group, an isopropyl group, an n-butyl group, an isobutyl group, a sec-butyl group, a tert-butyl group, a carboxymethyl group and a 2-carboxyethyl group.

Specific examples of the phenyl group which is optionally substituted with a sulfonate group include a phenyl group, a 3-sulfophenyl group, a 4-sulfophenyl group, a 2,4-disulfophenyl group and a 3,5-disulfophenyl group.

$R_{14}$ in general formula (IV) represents a cyano group, a carbamoyl group or a carboxy group.

$R_{15}$ and $R_{16}$ in general formula (IV) each independently represent a hydrogen atom, a methyl group, a chlorine atom or a sulfonate group.

A compound of general formula (IV) to be used in the present invention can have such a substituent of a substituted phenyl group shown in [E] as to include any of the following substituents: specifically, a cyano group, a carboxy group, a sulfonate group, a sulfamoyl group, a methylsulfonyl group, a 2-hydroxyethylsulfonyl group, a 3-sulfopropylsulfonyl group, a nitro group, a methyl group, a methoxy group and an ethyl group; and an ethoxy group, a 2-hydroxyethoxy group, a 2-sulfoethoxy group, a 3-sulfopropoxy group, a 4-sulfobutoxy group, a carboxymethoxy group and a 2-carboxyethoxy group. Among the above described groups, the cyano group, the carboxy group, the sulfonate group, the sulfamoyl group, the methylsulfonyl group, the hydroxyethylsulfonyl group, the 3-sulfopropylsulfonyl group or the nitro group can be employed. Particularly, the carboxy group or the sulfonate group can be employed.

In a compound of general formula (IV) to be used in the present invention, a substituent contained in the substituted paraphenylene group shown in [F] and [G] can each independently represent any of the following substituents: a carboxy group, a sulfonate group, a methyl group, a methoxy group, an ethyl group, an ethoxy group, a 2-hydroxyethoxy group, a 2-sulfoethoxy group, a 3-sulfopropoxy group, a 4-sulfobutoxy group, a carboxymethoxy group, and a 2-carboxyethoxy group. Among the above described groups, the sulfonate group, the methyl group, the methoxy group, the 2-hydroxyethoxy group, the 2-sulfoethoxy group, the 3-sulfopropoxy group or the carboxymethoxy group can be employed. Among the above described groups, the sulfonate group, the methyl group, the methoxy group or the 3-sulfopropoxy group can be particularly employed. [F] and [G] can each independently have 1 to 3 substituents among those substituents, and can particularly have 1 to 2 substituents.

As for a compound of general formula (IV) to be used in the present invention, the substituted paraphenylene group shown in [F] and [G] can each independently represent a group represented by the following general formula (7).

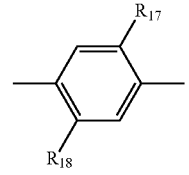

General formula (7)

In general formula (7), $R_{17}$ represents a sulfonate group or a sulfopropoxy group; and $R_{18}$, is a hydrogen atom, a methyl group, an ethyl group, a methoxy group or an ethoxy group.

A combination of $R_{17}$ and $R_{18}$ in general formula (7) can be a case where $R_{17}$ is a sulfonate group and $R_{18}$ is a hydrogen atom, or a case where $R_{17}$ is a 3-sulfopropoxy group and $R_{18}$ is a methyl group.

In a compound of general formula (IV) to be used in the present invention, $R_{13}$ can be any one of the following substituents: specifically, a methyl group, an ethyl group, an n-propyl group, an n-butyl group, a t-butyl group, a carboxymethyl group, a phenyl group, a 4-sulfophenyl group and a carboxy group. Among the above described groups, the methyl group, the n-propyl group, the carboxymethyl group and the 4-sulphophenyl-group can be employed; and the methyl group and the n-propyl group can be particularly employed.

A combination of $R_{13}$ and $R_{14}$ in the compound of general formula (IV) to be used in the present invention can include a case where $R_{13}$ is a methyl group and $R_{14}$ is a cyano group, or a case where $R_{13}$ is a methyl group and $R_{14}$ is a carbamoyl group.

$R_{15}$ and $R_{16}$ in the compound of general formula (IV) to be used in the present invention can each independently represent a hydrogen atom, a methyl group or a sulfonate group. A combination of $R_{15}$ and $R_{16}$ in the compound of general formula (IV) can be a case where $R_{15}$ is a hydrogen atom and $R_{16}$ is a sulfonate group, or a case where $R_{15}$ is a sulfonate group and $R_{16}$ is a hydrogen atom.

When the compound in the above described general formula (IV) is a salt, a positive ion forming the salt can be an inorganic or organic positive ion. When the inorganic or organic positive ion is represented by M, M each independently represents any one of a hydrogen atom, an alkaline metal, ammonium and an organic ammonium. Specific examples of the alkaline metal include lithium, sodium and potassium. Specific examples of the organic ammonium include acetamido, benzamido, methylamino, butylamino, diethylamino, phenylamino and triethanol amino.

Among the above described structures, a compound of the above described general formula (IV) can show an absorption spectrum having the maximum absorption wavelength ($\lambda_{max}$)

of 540 nm or longer to 570 nm or shorter, when the absorption spectrum is measured by using water as a solvent for the compound.

Specific examples of the compound of the above described general formula (IV) can include the following exemplified compounds IV-1 to IV-20. Incidentally, the following exemplified compounds are described in a form of a free acid. Of course, a compound contained in an ink according to the present invention is not limited to the following exemplified compounds as long as the compound is included in the structure and the definition of the above described general formula (IV). In the present invention, among the following exemplified compounds, the exemplified compounds IV-6, IV-13, IV-15 and IV-17 can be particularly employed.

Exemplified compound IV-1

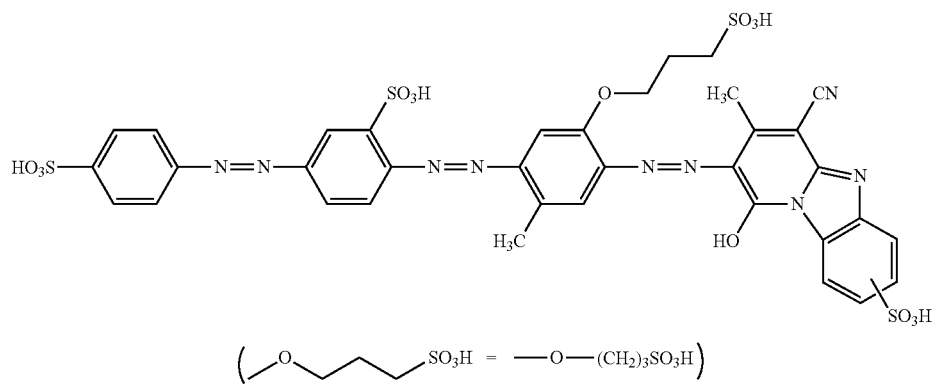

Exemplified compound IV-2

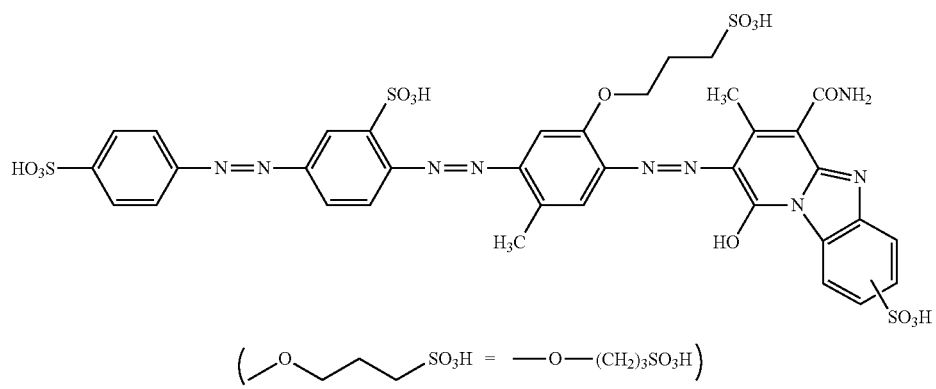

Exemplified compound IV-3

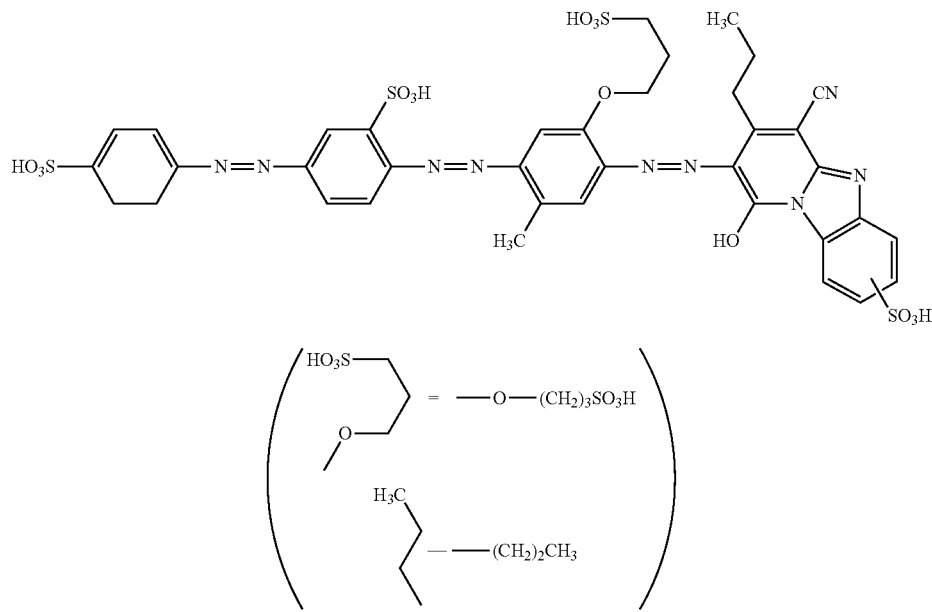

-continued
Exemplified compound IV-4
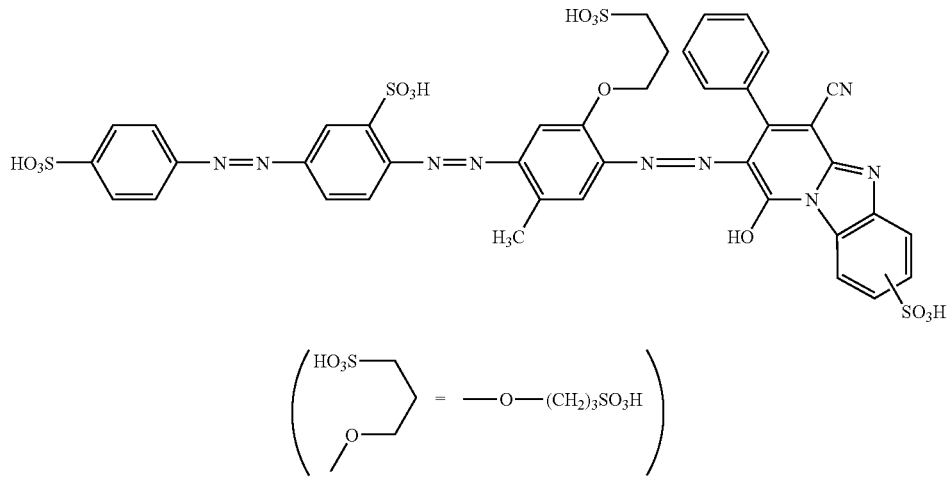
Exemplified compound IV-5
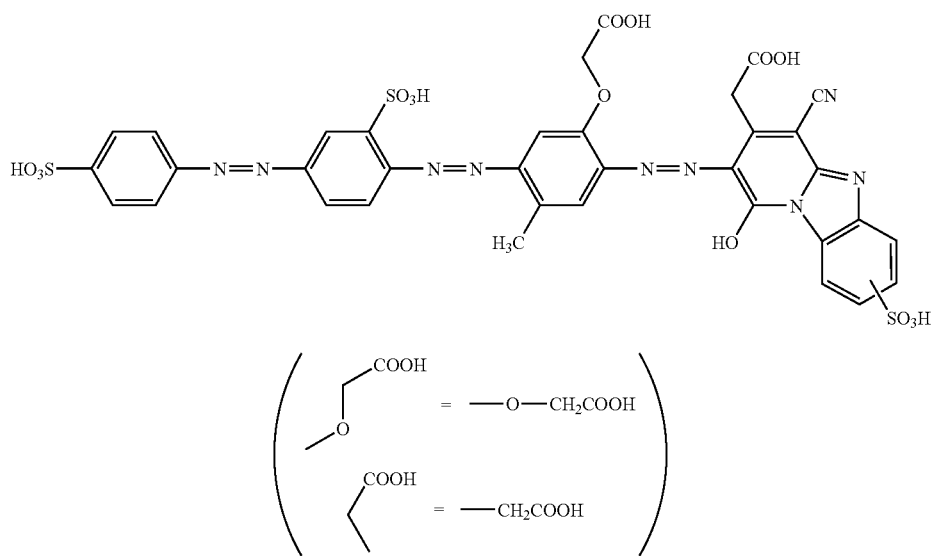
Exemplified compound IV-6
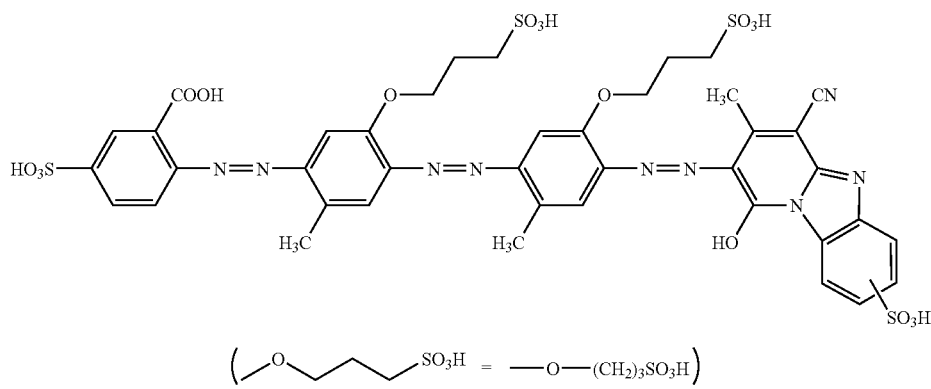

-continued
Exemplified compound IV-7
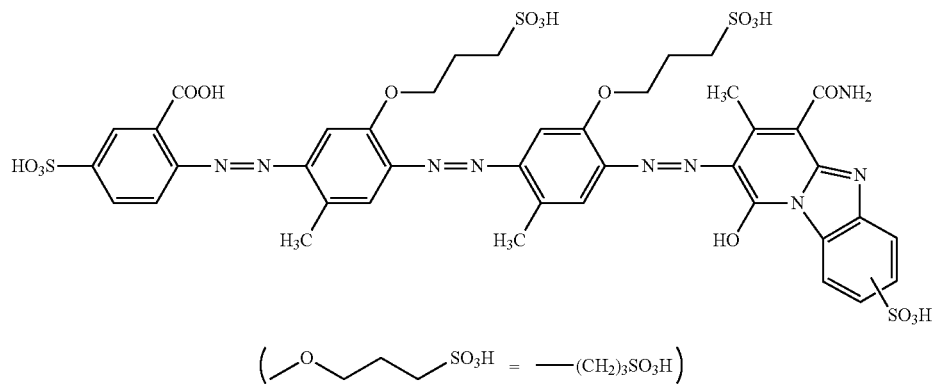
Exemplified compound IV-8
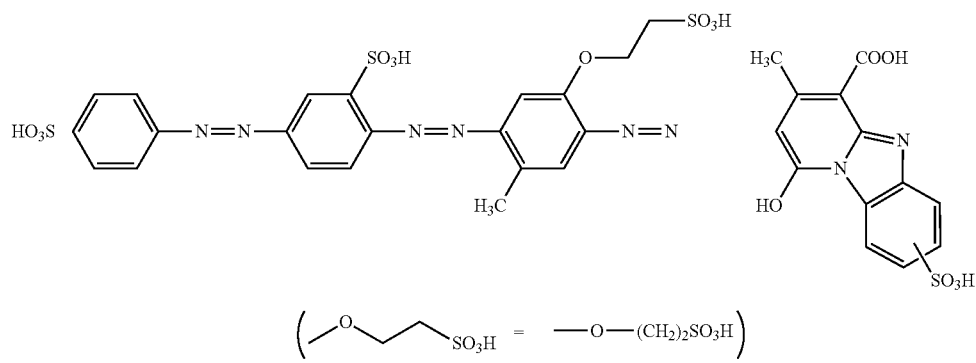
Exemplified compound IV-9
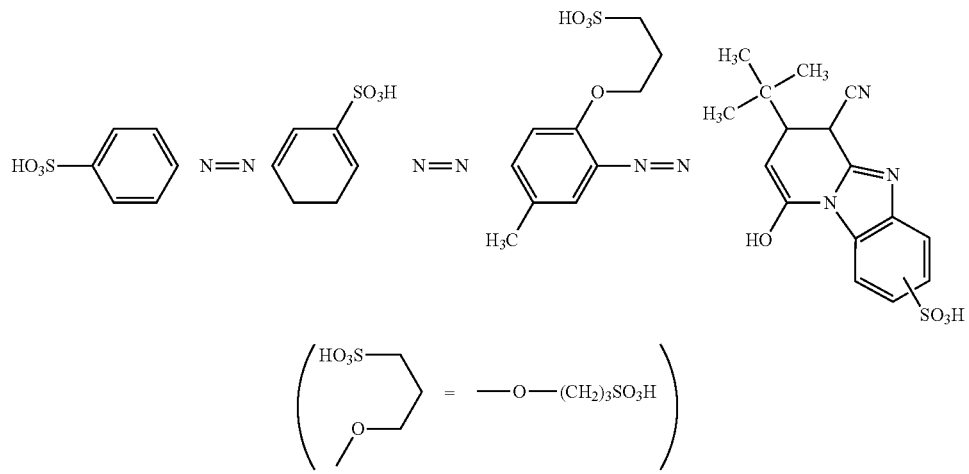
Exemplified compound IV-10
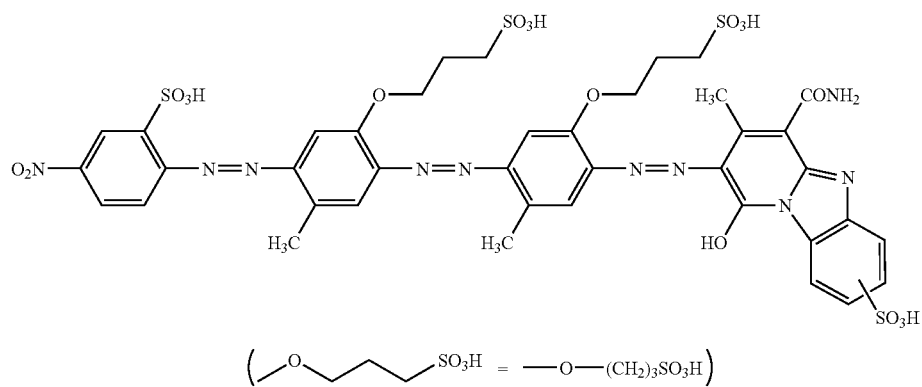

-continued
Exemplified compound IV-11
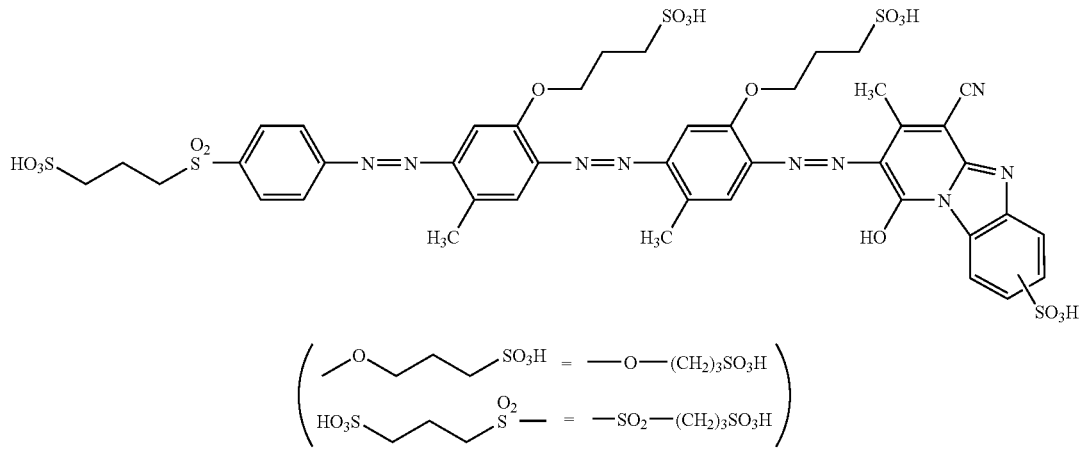
Exemplified compound IV-12
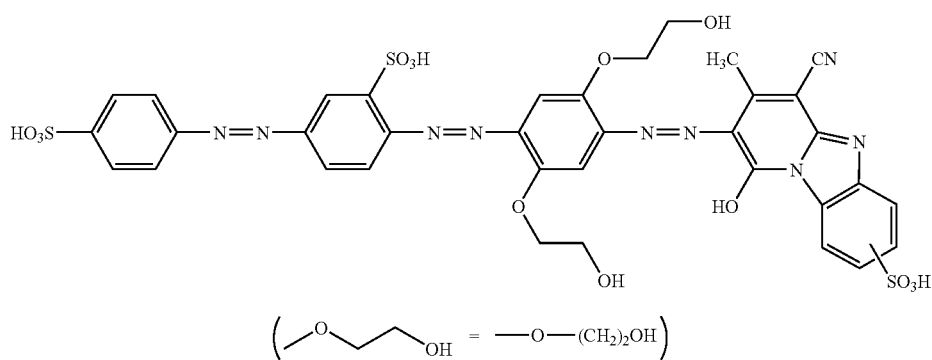
Exemplified compound IV-13
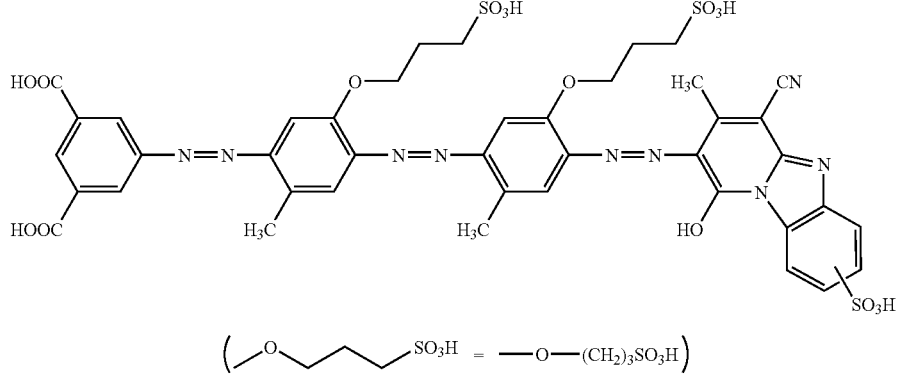
Exemplified compound IV-14
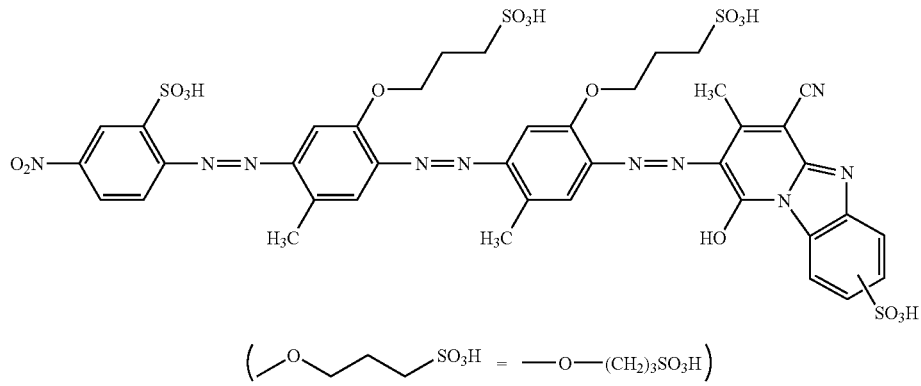

-continued
Exemplified compound IV-15
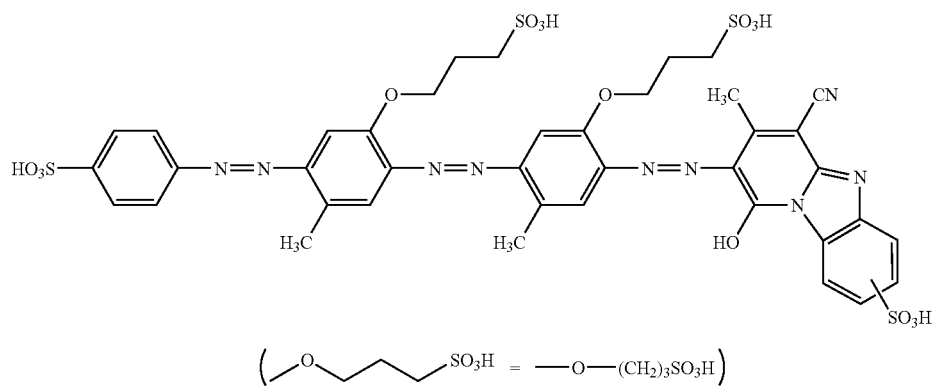
Exemplified compound IV-16
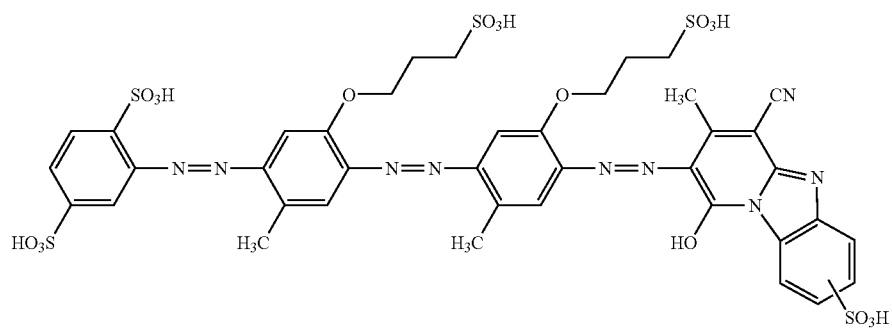
Exemplified compound IV-17
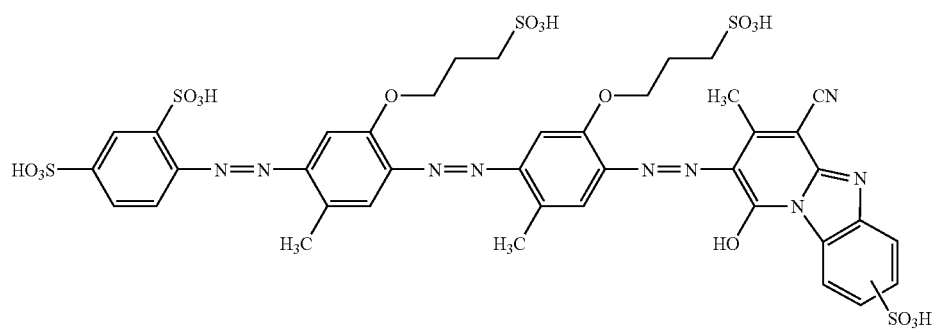
Exemplified compound IV-18
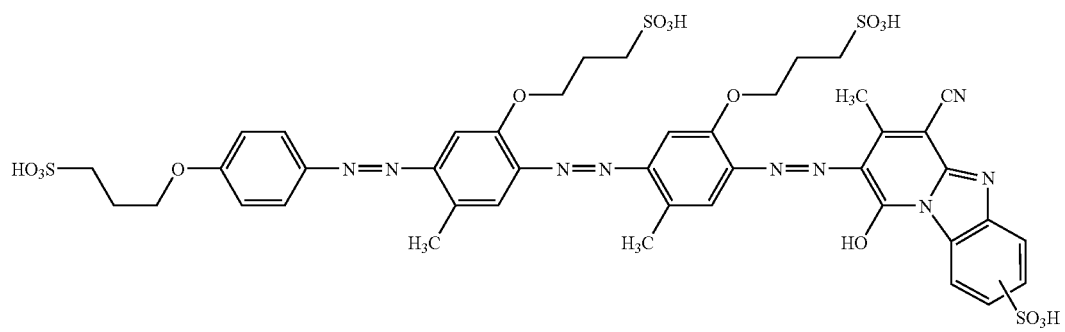
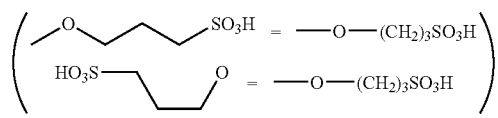

Exemplified compound IV-19

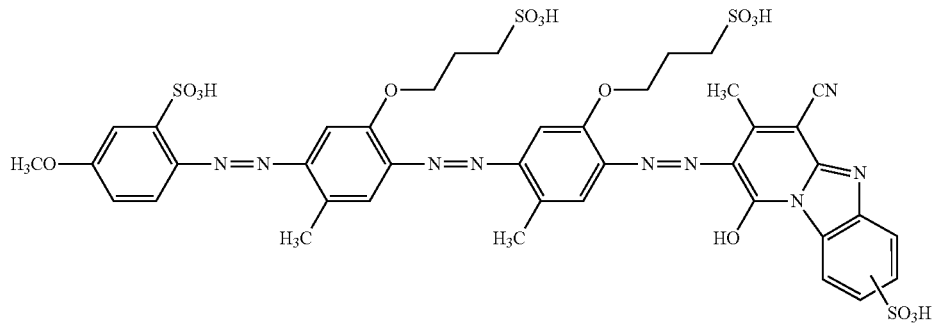

Exemplified compound IV-20

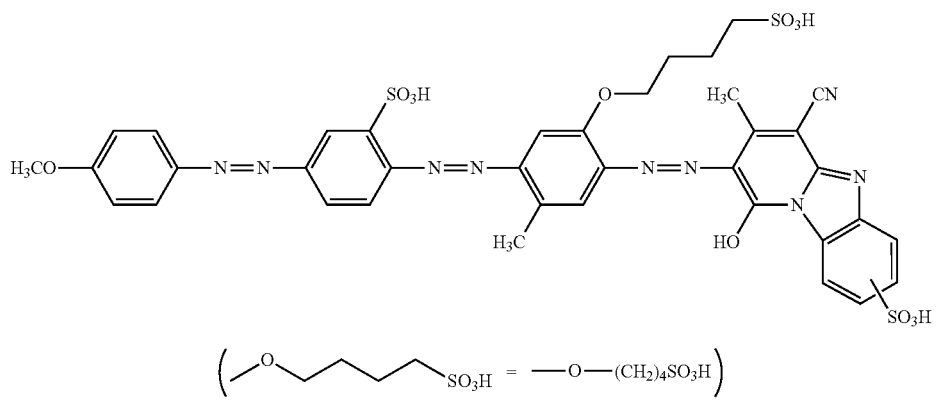

(Color Tone of Ink)

An ink according to the present invention is an ink having a black color tone. The color tone for a black ink, which can be used in the present invention, specifically means the following color tone. $L^*$, $a^*$ and $b^*$ in an $L^*$ $a^*$ $b^*$ color space specified by CIE (International Commission on Illumination) are measured on an image having a gradation, which has been recorded while using an ink and sequentially decreasing a recording duty from 100%. The ink according to the present invention has been defined to be the ink having the color tone for the black ink, which can be used in the present invention, when the values of $L^*$, $a^*$ and $b^*$ at least in a portion recorded with the recording duty of 100% satisfy the following relationship. Specifically, when the above described measured values on the ink satisfy the relationship of $0 \leq L^* \leq 50$, $-25 \leq a^* \leq 25$ and $-25 \leq b^* \leq 25$, the ink shows the color tone which can be used as the black ink. Furthermore, the image recorded by using the black ink is occasionally required to have a color tone which is closer to a neutral as well, so that an ink satisfying the following two definitions has been defined to be an ink having a color tone which can be used for a black ink in the present invention. Specifically, the definition can be firstly that the values of $L^*$, $a^*$ and $b^*$ in the portion recorded with a recording duty of 100% satisfy the relationship of $0 \leq L^* \leq 50$, $-5 \leq a^* \leq 5$ and $-5 \leq b^* \leq 5$; and can be secondly that the values of $a^*$ and $b^*$ satisfy $-10 \leq a^* \leq 10$ and $-10 \leq b^* \leq 10$, in each of gradations recorded with decreased recording duties. Incidentally, the above described values of $L^*$, $a^*$ and $b^*$ to be used in these definitions can be measured by using a spectral photometer (trade name: Spectrolino; manufactured by Gretag Macbeth), for instance. Of course, the present invention is not limited to the above description.

(Content of Coloring Material)

A content (% by mass) of a compound of general formula (I) in an ink according to the present invention can be set at 0.1% by mass or more to 15.0% by mass or less with respect to the total mass of the ink, and can be particularly set at 0.5% by mass or more to 10.0% by mass or less. As was previously described, the coloring material can employ compounds in general formulas (I), (III) and (IV) jointly. In this case, the total content (% by mass) of these compounds can be set at 0.1% by mass or more to 15.0% by mass or less with respect to the total mass of the ink, and can be particularly set at 0.5% by mass or more to 10.0% by mass or less. When the content (total) of the coloring material in the ink is less than 0.1% by mass, there is a case where the image does not show sufficient color developability. On the other hand, when the content (total) exceeds 15.0% by mass, there is a case where the ink does not sufficiently provide sticking resistance.

When the ink according to the present invention has been designed so as to satisfy the following two requirements, an image having a gradation recorded by using the ink can provide a more neutral impression. One of the requirements is to set the above described content (% by mass) of the compound of general formula (I) in an ink at a ratio occupying 50.0% or more with respect to the total content (% by mass) of all coloring material s in the ink. Furthermore, in addition to the above description, the requirement is to set the above described content (% by mass) of the compound of general formula (III) at 0.60 or more to less than 1.00 by a mass ratio with respect to the content (% by mass) of the compound of general formula (IV). Then, the image having the gradation can provide a more neutral impression. In addition, in this case, the content (% by mass) of the compound of general formula (I) in the ink can be set at 75.0% or less with respect to the total content (% by mass) of all coloring materials in the ink. Specifically, the ink can satisfy the expressions of {(content of compound of general formula (I))/(total content of all coloring materials)}×100=50.0 or more to 75.0 or less, and {(content of compound of general formula (III))/(content of compound of general formula (IV))}=0.60 or more to less than 1.00.

(Verification Method for Coloring Material)

The following verification methods (1) to (3) with the use of a high performance liquid chromatography (HPLC) can be applied to the verification of whether a coloring material to be used in the present invention is contained in an ink or not.

(1) retention time of peak (2) maximum absorption wavelength in peak of item (1)

(3) M/Z (positive) and M/Z (negative) in mass spectrum for peak of item (1)

The analysis condition in the high performance liquid chromatography will now be described below. Firstly, an approximately 1,000 times diluted liquid (ink) by pure water was prepared as a sample for measurement. The sample was analyzed with the high performance liquid chromatography in the following condition, and the retention time of the peak and the maximum absorption wavelength of the peak were measured.

column: SunFire $C_{18}$ (manufactured by Nihon Waters K.K.) 2.1 mm×150 mm, column temperature: 40° C.

flow rate: 0.2 mL/min

PDA: 200 nm to 700 nm moving phase and gradient condition: Table 2

TABLE 2

| Moving phase and gradient condition | | | | |
|---|---|---|---|---|
| | 0 to 5 minutes | 5 to 24 minutes | 24 to 31 minutes | 31 to 45 minutes |
| A: Pure water | 85% | 85→45% | 45→0% | 0% |
| B: Methanol | 10% | 10→50% | 50→95% | 95% |
| C: 0.2 mol/L aqueous ammonium acetate | 5% | 5% | 5% | 5% |

In addition, the analysis condition of a mass spectrum will now be described below. The mass spectrum of the obtained peak is measured under the following condition, and the most strongly detected M/Z is measured in the positive side and the negative side, respectively.

Ionization method

ESI

Capillary voltage: 3.5 kV

Desolvation gas: 300° C.

Ion source temperature: 120° C.

Detector

Positive: 40 V 200 to 1500 amu/0.9 sec

Negative: 40 V 200 to 1500 amu/0.9 sec

The following compounds were used as a representative example of each coloring material with the above described method and under the above described conditions. Specifically, exemplified compound I-5 which is a specific example of the coloring material in general formula (I), exemplified compound III-1 which is a specific example of a compound of general formula (III), and exemplified compound IV-17 which is a specific example of a compound of general formula (IV) were subjected to measurement. The specific structures of these exemplified compounds were previously shown. The consequently obtained retention time, the maximum absorption wavelength and the values of M/Z (positive) and M/Z (negative) were shown in Table 3. The above description means that when an unknown ink is measured with the similar method and under similar conditions to the above described method and conditions, and the result corresponds to the analysis result shown in Table 3, the ink is determined to be an ink which contains a compound corresponding to the compound specified in the present invention.

TABLE 3

| | Analysis result | | | |
|---|---|---|---|---|
| Exemplified compound | Retention time [minute] | Maximum absorption wavelength [nm] | M/Z positive | M/Z negative |
| I-5 | 29.0-30.0 | 600-620 | 1091-1094 | 1090-1093 |
| III-1 | 30.0-31.0 | 410-430 | 573-576 | 1150-1153 |
| IV-17 | 31.0-32.0 | 550-570 | 1079-1082 | 1077-1080 |

(Aqueous Medium)

An ink according to the present invention can employ an aqueous medium which is water or a mixed solvent of water and a water-soluble organic solvent. Deionized water (ion exchange water) can be used for the water. The content (% by mass) of water in the ink can be set at 10.0% by mass or more to 90.0% by mass or less with respect to the total mass of the ink.

The water-soluble organic solvent is not limited particularly as long as it is water-soluble, so that an alcohol, a polyhydric alcohol, a polyglycol, glycol ether, a nitrogen-containing polar solvent, a sulfur-containing polar solvent or the like can be employed. The content (% by mass) of the water-soluble organic solvent in the ink can be set at 5.0% by mass or more to 90.0% by mass or less with respect to the total mass of the ink, and can be particularly set at 10.0% by mass or more to 50.0% by mass or less. When the content of the water-soluble organic solvent is less than the above described range, there is a case where the ink cannot show the reliability such as ejection stability when having been used in an ink jet recording apparatus. On the other hand, when the content of the water-soluble organic solvent is more than the above described range, there is a case where the viscosity of the ink increases and a poor supply of the ink occurs. The content of the water-soluble organic solvent includes the contents of a compound of general formula (II) and glycerin.

The water-soluble organic solvent can specifically include, for instance, the following compounds: an alkyl alcohol having 1 to 4 carbon atoms, such as methyl alcohol, ethyl alcohol, n-propyl alcohol, isopropyl alcohol, n-butyl alcohol, sec-butyl alcohol and tert-butyl alcohol; an amido compound such as dimethylformamide and dimethylacetamide; ketone or a ketoalcohol such as acetone and diacetone alcohol; an ether compound such as tetrahydrofuran and dioxane; a polyalkylene glycol having weight average molecular weight of 200 to 1,000 such as polyethylene glycol and polypropylene glycol; an glycol such as ethylene glycol, propylene glycol, butylene glycol, diethylene glycol, triethylene glycol and hexylene glycol; an alkylene glycol of which the alkylene group has 2 to 6 carbon atoms, such as 1,5-pentanediol, 1,6-hexanediol, 2-methyl-1,3-propanediol, 3-methyl-1,5-pentanediol and 1,2,6-hexanetriol; an alkyl ether acetate such as polyethylene glycol monomethyl ether acetate; an alkyl ether of a polyhydric alcohol, such as ethylene glycol monomethyl (or ethyl) ether, diethylene glycol methyl (or ethyl) ether, triethylene glycol monomethyl (or ethyl) ether; and n-methyl-2-pyrrolidone, 2-pyrrolidone and 1,3-dimethyl-2-imidazolidinone. Of course, the solvent in the ink according to the present invention is not limited to the above water-soluble organic solvents. One or more of the water-soluble organic solvents can be used as needed.

(Other Additives)

An ink according to the present invention may contain a water-soluble organic compound which is solid at room temperature, such as a polyhydric alcohol like trimethylolpropane and trimethylolethane, and an urea derivative like ethylene urea, other than the above described components, as needed. The ink according to the present invention may contain various additives such as a surfactant, a pH moderator, an anti-rust agent, an antiseptic agent, a mildewproofing agent, an antioxidant, a reduction-preventing agent, an evaporation accelerator, a chelating agent and a water-soluble polymer, as needed.

<Other Inks>

The ink according to the present invention can be employed in combination with an ink having a color tone different from the ink according to the present invention, so as to record a full color image. The ink according to the present invention can be used together with at least any one ink selected from a black ink, a cyan ink, a magenta ink, a yellow ink, a red ink, a green ink and a blue ink, for instance. The ink according to the present invention can also be used in combination with a so-called pale ink having the substantially same color tone as that of those inks. A coloring material for those inks or pale inks can employ any of a well-known dye and a newly-synthesized coloring material.

<Ink Jet Recording Method>

An ink jet recording method according to the present invention is an ink jet recording method which records an image by ejecting an ink by an ink jet system, wherein the ink is the above described ink jet ink according to the present invention. The ink jet recording method according to the present invention can be applied to a recording method which ejects ink by exerting mechanical energy on the ink, and a recording method which ejects ink by exerting thermal energy on the ink. The ink jet recording method according to the present invention can particularly employ the method of exerting the thermal energy on the ink.

<Ink Cartridge>

An ink cartridge according to the present invention is an ink cartridge which has an ink storage portion for storing an ink provided therein, wherein the accommodated ink is the above described ink jet ink according to the present invention.

<Recording Unit>

A recording unit according to the present invention is a recording unit which has an ink storage portion for storing an ink and a recording head for ejecting the ink provided therein, wherein the accommodated ink is the above described ink jet ink according to the present invention. The recording unit according to the present invention can particularly employ a recording unit in which the above described recording head is a type of ejecting the ink by exerting thermal energy corresponding to the recording signal on the ink. Furthermore, the recording unit according to the present invention can provide an effect when the recording head has an exothermic portion of which the liquid-contacting surface includes a metal and/or a metal oxide. Specific examples of the metal and/or metallic oxide constituting the above described liquid-contacting surface of the exothermic portion include a metal such as Ta, Zr, Ti, Ni and Al, and a metallic oxide thereof.

<Ink Jet Recording Apparatus>

An ink jet recording apparatus according to the present invention is an ink jet recording apparatus which has an ink storage portion for storing an ink and a recording head for ejecting the ink provided therein, wherein the accommodated ink is the above described ink jet ink according to the present invention. The ink jet recording apparatus according to the present invention can particularly employ a recording apparatus of which the above described recording head is a type of ejecting the ink by exerting thermal energy corresponding to the recording signal on the ink.

A schematic structure of the mechanical section in the ink jet recording apparatus of one example according to the present invention will now be described below. The ink jet recording apparatus includes a paper feed section, a transportation section, a carriage section, a paper ejection section, a cleaning section and an exterior section for protecting the above sections and giving the design characteristics, according to a role of each mechanism.

Figure 2:
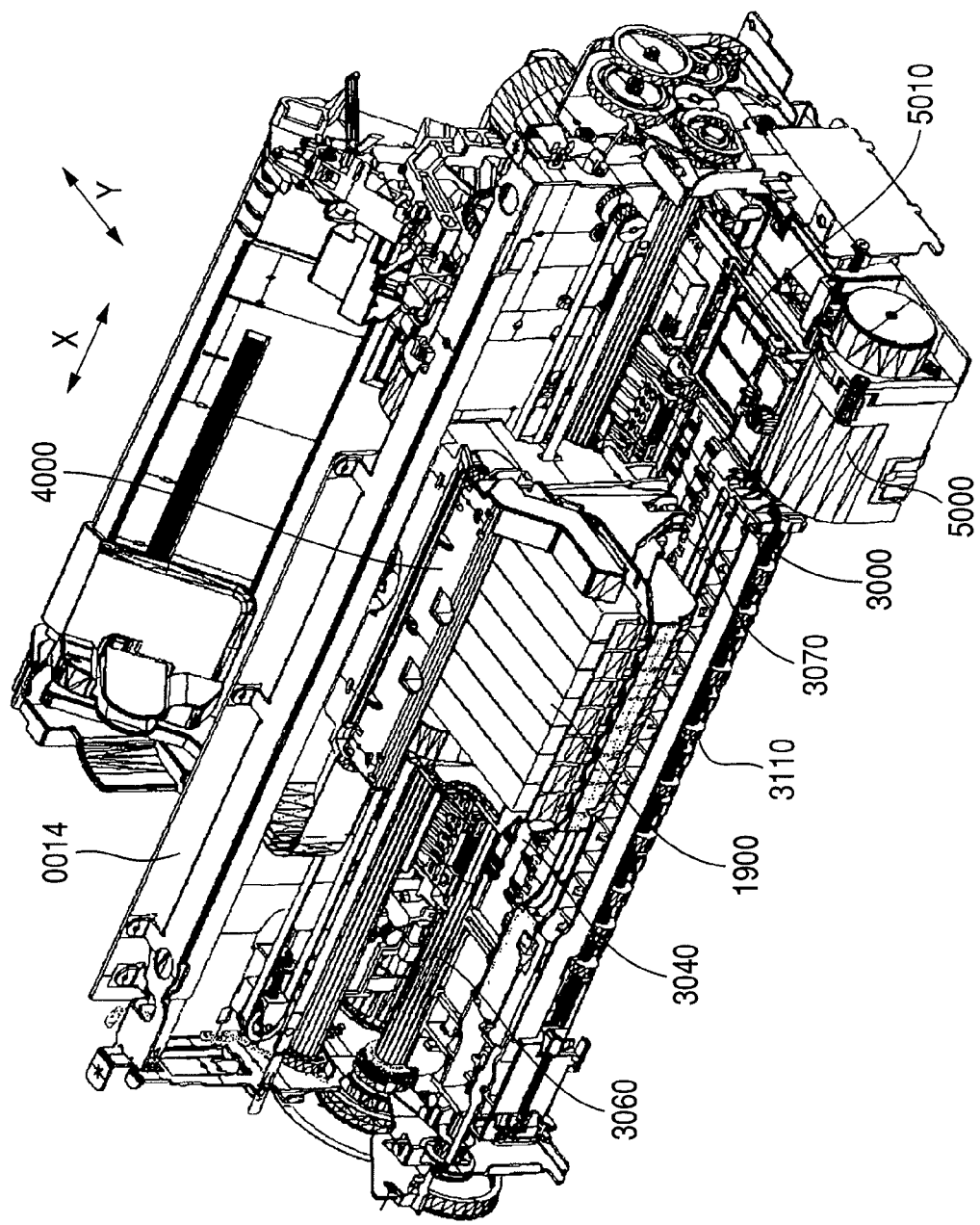
FIG. 2 is a perspective view of a mechanical section of an ink jet recording apparatus.
Figure 3:
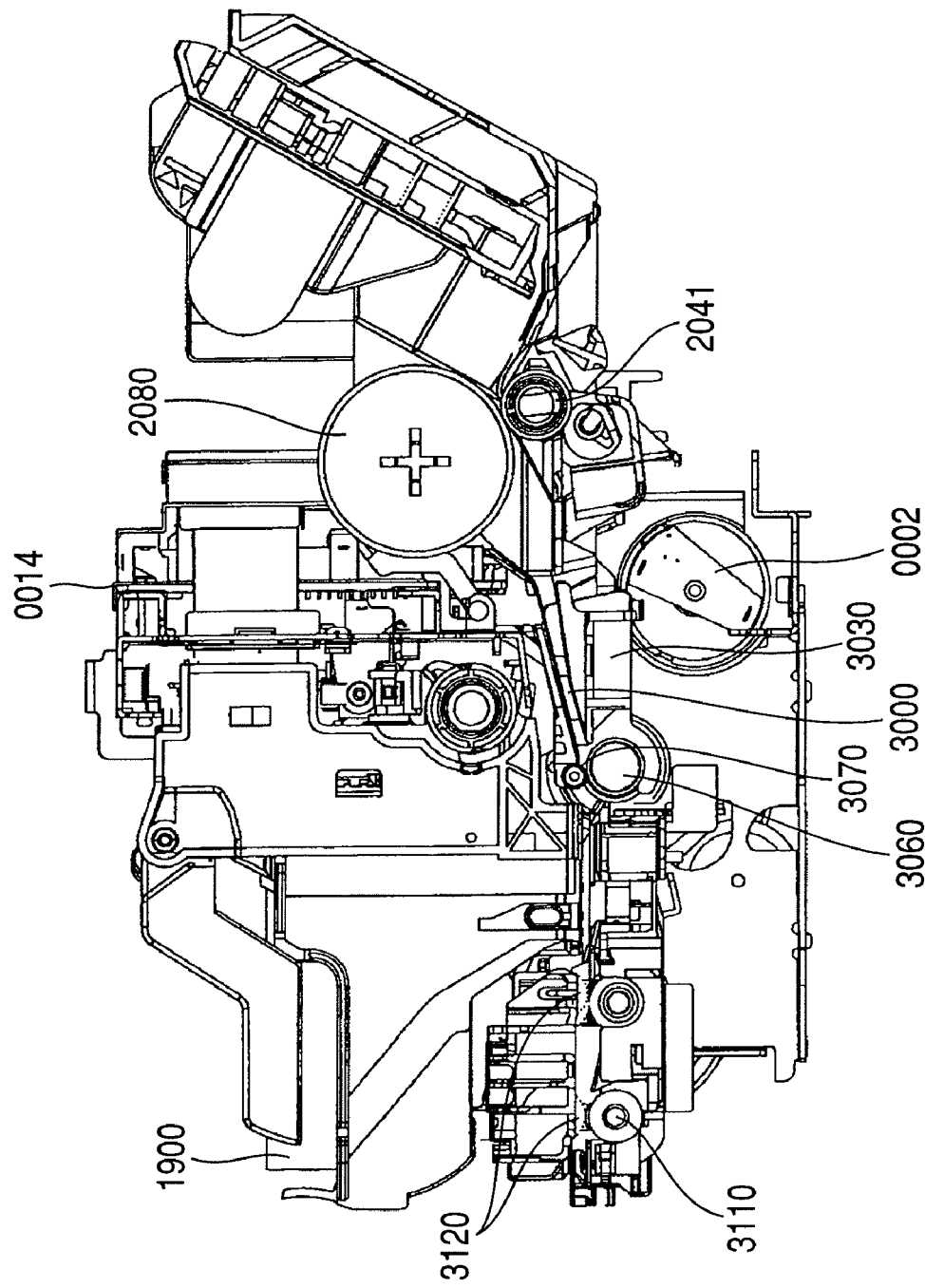
FIG. 3 is a sectional view of an ink jet recording apparatus.

FIG. 1 is a perspective view of an ink jet recording apparatus. FIGS. 2 and 3 are views for illustrating an inner mechanism of the ink jet recording apparatus. FIG. 2 is a perspective view which is viewed from an upper right part, and FIG. 3 is a side sectional view of the ink jet recording apparatus.

When a paper is fed, only the predetermined number of sheets of the recording medium are sent to a nipping part including a paper feed roller 2080 and a separation roller 2041, in a paper feed section including a paper feed tray 2060. The recording medium is separated in the nipping part, and only a recording medium in the uppermost part is transported. The recording medium which has been transported to a transportation section is guided by a pinch roller holder 3000 and a paper guide flapper 3030, and is transported to a pair of rollers which are a transportation roller 3060 and a pinch roller 3070. The pair of rollers of the transportation roller 3060 and the pinch roller 3070 are rotated by being driven by an LF motor 0002, and transport the recording medium on a platen 3040 through the rotation.

Figure 4:
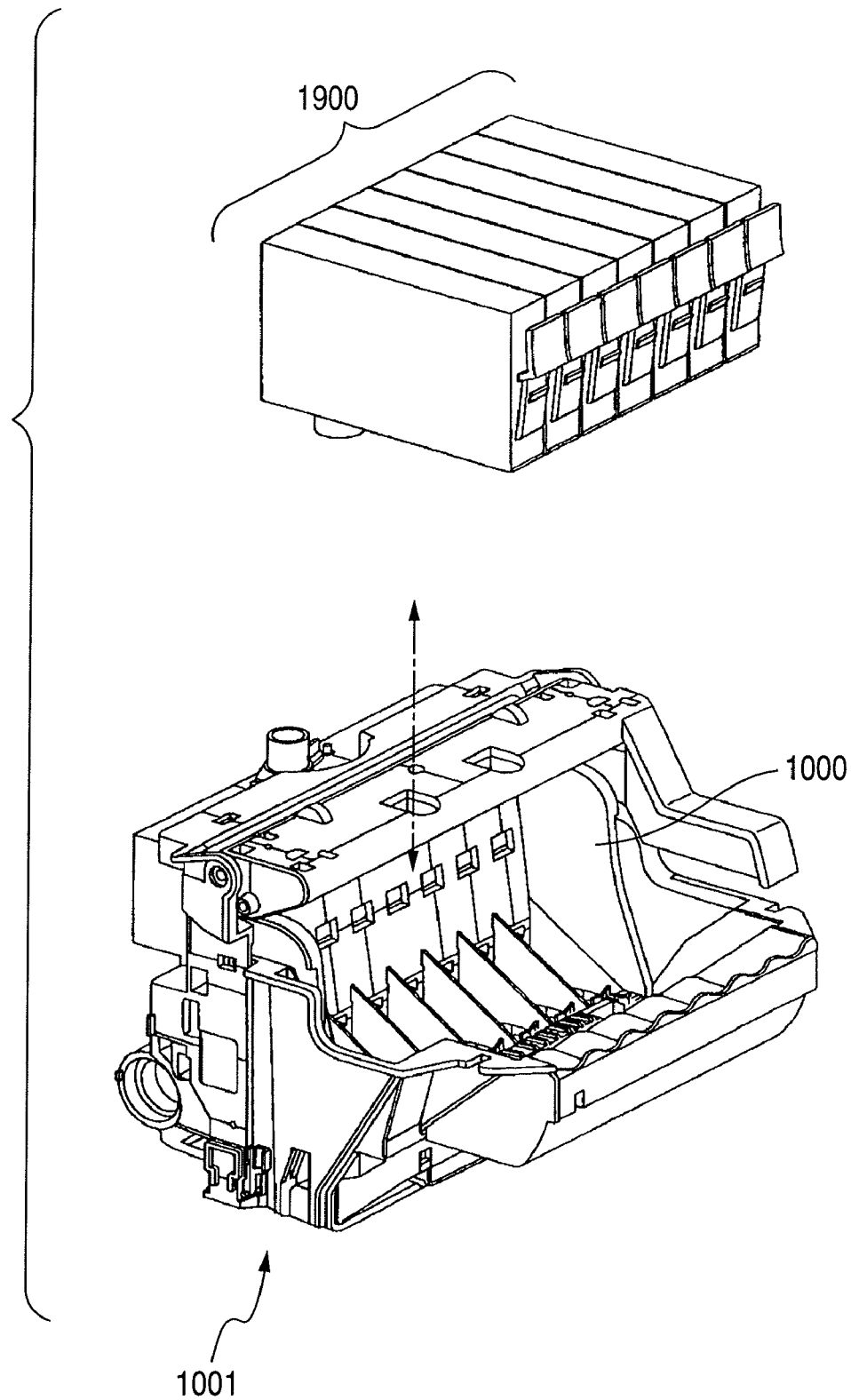
FIG. 4 is a perspective view for illustrating a state of mounting an ink cartridge on a head cartridge.

When an image is recorded on the recording medium, a carriage section makes a recording head 1001 (which is shown in FIG. 4 and of which the structure will be described in detail later) arranged on a position at which a target image is to be recorded, and ejects the ink onto the recording medium according to a signal sent from an electric substrate 0014. The recording apparatus records the image on the recording medium, by alternately repeating a main scan of making a carriage 4000 scan in a row direction, and a subscan of making the transportation roller 3060 transport the recording medium in a line direction, while making the recording head 1001 record the image. The recording medium having the image recorded thereon is transported in a state of being sandwiched by a nip between a first paper ejection roller 3110 and a spur 3120 in the paper ejection section, and is ejected to a copy receiving tray 3160.

By the way, a cleaning section cleans the recording head 1001 before and after the action of recording the image. When a pump 5000 is operated in a state in which an ejection port of the recording head 1001 is capped by a cap 5010, the unnecessary ink is sucked through the ejection port of the recording head 1001. An ink remaining in the inner part of the cap 5010 is sucked in a state in which the cap 5010 is opened, which results in inhibiting the remaining ink from causing sticking and other adverse effects.

(Structure of Recording Head)

A structure of a head cartridge 1000 will now be described below. The head cartridge 1000 has a recording head 1001, a unit of mounting an ink cartridge 1900 thereon and a unit of supplying an ink to the recording head from the ink cartridge 1900; and is releasably mounted on a carriage 4000.

FIG. 4 is a view that illustrates a state in which an ink cartridge 1900 is mounted on a head cartridge 1000. The ink jet recording apparatus records an image with the use of each ink of yellow, magenta, cyan, black, pale magenta, pale cyan and green. Accordingly, an ink cartridge 1900 independently prepares spaces for seven colors. However, in the above cartridge, an ink according to the present invention is used at least in one ink. As is illustrated in FIG. 4, each of ink cartridges is releasably mounted on the head cartridge 1000. The ink cartridge 1900 can be attached and detached even in a state in which the head cartridge 1000 is mounted on the carriage 4000.

Figure 5:
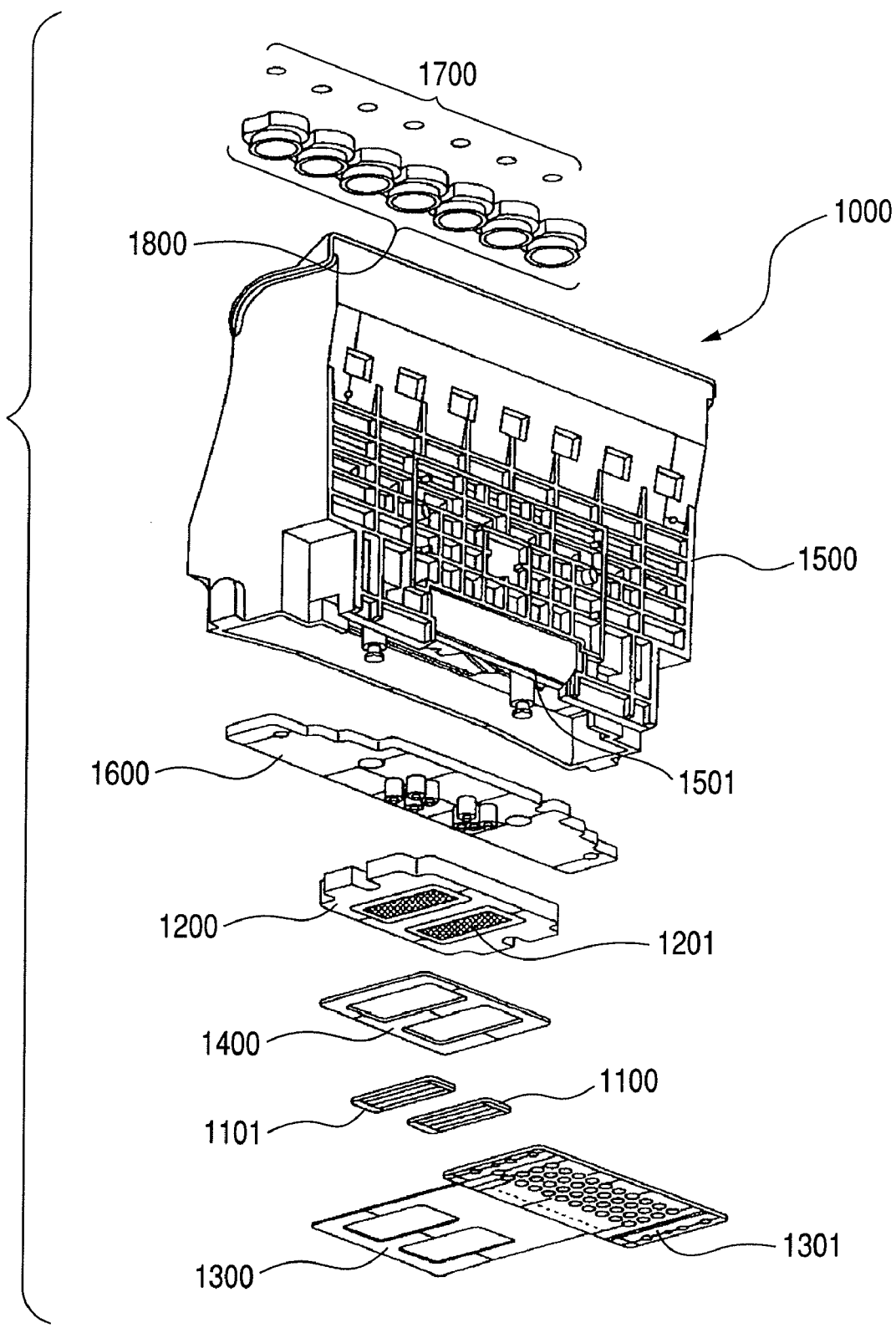
FIG. 5 is an exploded perspective view of a head cartridge.

FIG. 5 is an exploded perspective view of the head cartridge 1000. The head cartridge 1000 includes a recording element substrate, a plate, an electric wiring board 1300, a cartridge holder 1500, a flow-channel forming member 1600, a filter 1700 and a seal rubber 1800. The recording element substrate includes a first recording element substrate 1100 and a second recording element substrate 1101, and the plate includes a first plate 1200 and a second plate 1400.

The first recording element substrate 1100 and the second recording element substrate 1101 are Si substrates, and have a plurality of recording elements (nozzle) for ejecting an ink formed on one side thereof with a photolithographic technology. Electric wires such as Al for supplying an electric power to each recording element are formed through a film-forming technology, and a plurality of ink flow channels corresponding to an individual recording element are formed with a photolithographic technology. An ink supply port for supplying an ink to a plurality of ink flow channels therethrough is formed so as to be opened on a rear side of the substrates.

Figure 6:
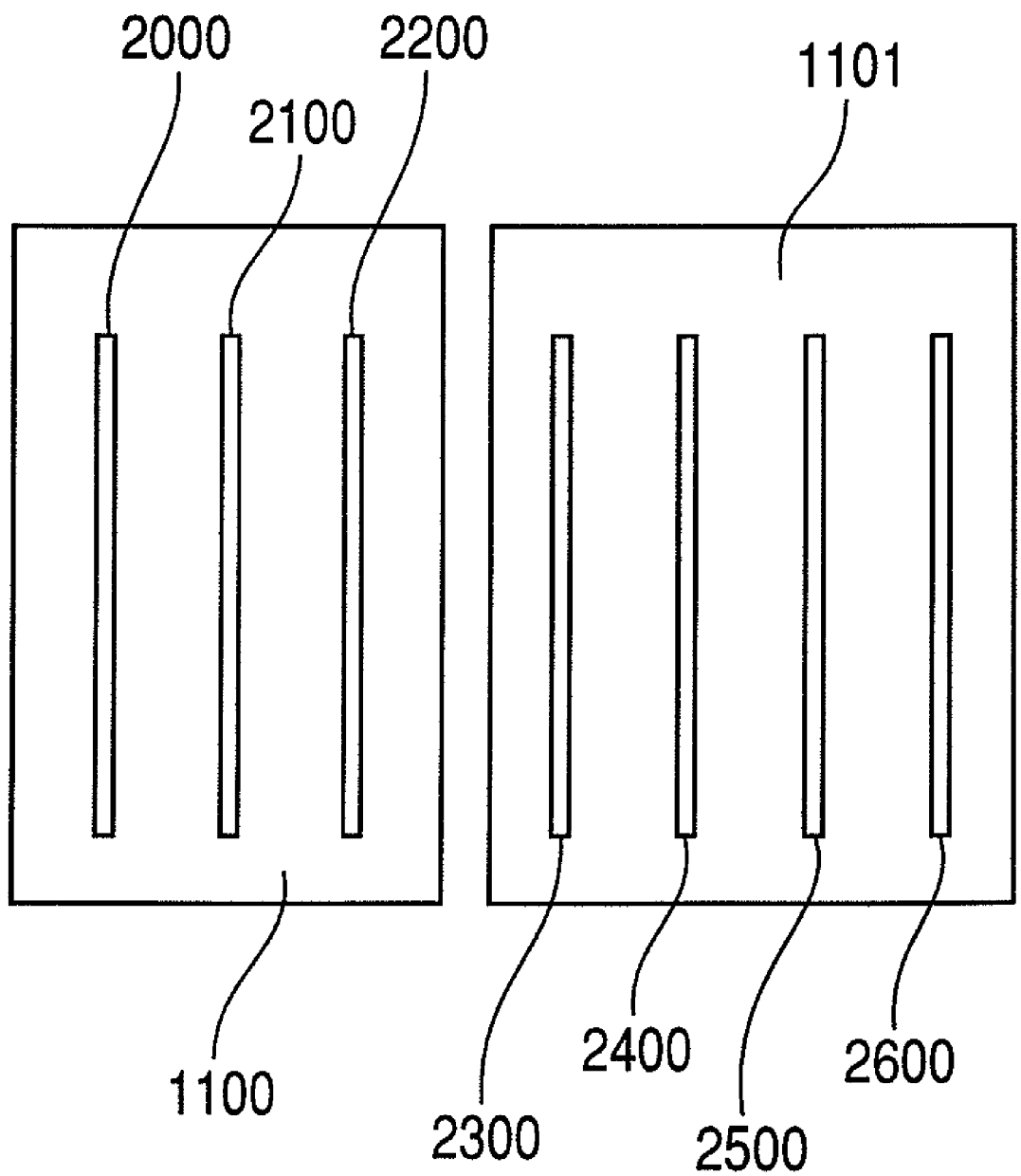
FIG. 6 is a front view for illustrating a recording element substrate in a head cartridge.

FIG. 6 is a front enlarged view for describing structures of a first recording element substrate 1100 and a second recording element substrate 1101. 2000 to 2600 are rows (hereinafter referred to as nozzle row) in a recording element, which correspond to different ink colors respectively. The first recording element substrate 1100 has nozzle rows for three colors formed thereon, which are a nozzle row 2000 for a yellow ink, a nozzle row 2100 for a magenta ink and a nozzle row 2200 for a cyan ink. The second recording element substrate 1101 has nozzle rows for four colors formed thereon, which are a nozzle row 2300 for a pale cyan ink, a nozzle row 2400 for a black ink, a nozzle row 2500 for a green ink and a nozzle row 2600 for a pale magenta ink.

Each of nozzle rows includes 768 pieces of nozzles which are aligned in a transportation direction (subscanning direction) of the recording medium at a 1,200 dpi (dot/inch; reference value) spacing, and each nozzle ejects an ink of approximately 2 picoliter. The aperture area in each ejection port is set at approximately 100 ∞m². A nozzle in the present invention can eject such a small droplet as an ejection volume of 5 picoliter or less and particularly an ejection volume of 2 picoliter or less, from a viewpoint of a photographic quality. In addition, the ejection port can be less than 10 μm. A plurality of nozzles (5 picoliter, 2 picoliter and 1 picoliter, for instance) can be employed jointly in order to eject inks with a plurality of ejection volumes from the viewpoint of satisfying both a photographic quality and a high speed recording.

The structure of the recording head will now be described below with reference to FIGS. 4 and 5. The first recording element substrate 1100 and the second recording element substrate 1101 are adhesively fixed to a first plate 1200. In the first plate 1200, an ink supply port 1201 is formed for supplying an ink to the first recording element substrate 1100 and the second recording element substrate 1101. The first plate 1200 further has a second plate 1400 having an aperture adhesively fixed thereon. This second plate 1400 holds an electric wiring board 1300 so that the electric wiring board 1300 can be electrically connected with the first recording element substrate 1100 and the second recording element substrate 1101.

The electric wiring board 1300 applies an electric signal for making each nozzle formed on the first recording element substrate 1100 and the second recording element substrate 1101 eject an ink. This electric wiring board 1300 has electric wiring which corresponds to the first recording element substrate 1100 and the second recording element substrate 1101, and an external signal input terminal 1301 which is positioned in an end of the electric wiring and receives an electric signal from the ink jet recording apparatus. The external signal input terminal 1301 is positioned and fixed on a rear side of a cartridge holder 1500.

The flow-channel forming member 1600 is fixed to the cartridge holder 1500 which holds the ink cartridge 1900, for instance, with an ultrasonic welding technique, and forms an ink flow channel 1501 which starts from the ink cartridge 1900 and leads to the first plate 1200. A filter 1700 is provided on an end in an ink cartridge side of the ink flow channel 1501 which is engaged in the ink cartridge 1900, and accordingly can prevent dust from entering from the outside. A seal rubber 1800 is mounted on an engaging part in between the filter 1700 and the ink cartridge 1900, and can prevent an ink from evaporating from the engaging part.

As was described above, the head cartridge 1000 is constituted by combining the cartridge holder section to the recording head section 1001 with an adhesive or the like. The cartridge holder section includes the cartridge holder 1500, the flow-channel forming member 1600, the filter 1700 and the seal rubber 1800. The recording head section 1001 includes the first recording element substrate 1100, the second recording element substrate 1101, the first plate 1200, the electric wiring board 1300 and the second plate 1400.

Here, a recording head was described on that of a thermal ink jet type which records with the use of a thermoelectric conversion body (recording element) which generates a thermal energy for causing a film boiling in an ink according to an electrical signal, as one embodiment of the recording head. The representative structure and principle can employ a basic principle which is disclosed in U.S. Pat. Nos. 4,723,129 and 4,740,796. This type can be applied to any one of a so-called on-demand type and a continuous type.

It is particularly effective to apply the thermal ink jet type to the on-demand type. In the case of the on-demand type, at least one drive signal which gives a rapid temperature rise exceeding the film boiling point while corresponding to a recording information is applied to a thermoelectric conversion body which is arranged so as to correspond to a liquid flow-channel that holds an ink. The above operation makes the thermoelectric conversion body generate thermal energy, causes film boiling in the ink, and consequently can form air bubbles in the ink, which correspond to the drive signal in a one-to-one relationship. This growth and shrinkage of the air bubbles make the ink ejected through an ejection port to form at least one droplet. The drive signal can be formed so as to form a pulse shape. Then, the air bubbles grow and shrink immediately and adequately, so that the ink can be ejected so as to excellently respond to the drive signal in particular.

An ink according to the present invention is not limited to the above described thermal ink jet type, but can be applied to an ink jet recording apparatus using mechanical energy, which will be described later. The ink jet recording apparatus having such a configuration includes a nozzle-formed substrate having a plurality of nozzles therein, a pressure-generating element having a piezoelectric material which is arranged so as to oppose to the nozzles and an electroconductive material, and an ink which fills the periphery of the pressure-generating element; and displaces the pressure-generating element through applied voltage to make the pressure-generating element eject the ink from the nozzle.

The ink jet recording apparatus is not limited to an apparatus in which the recording head is separated from the ink cartridge as was described above, but may employ an apparatus in which the recording head and the ink cartridge are unseparatably integrated. Furthermore, the ink cartridge may be a one which is separatably or unseparatably integrated with the recording head, and is mounted on the carriage, or alternatively a one which is provided on a fixed portion of the ink jet recording apparatus and supplies an ink to the recording head through an ink supply member such as a tube. When the ink cartridge has a structure for exerting a preferable negative pressure on the recording head provided therein, the ink cartridge can have the following structure. Specifically, the ink cartridge can employ a configuration in which an absorber is arranged in its ink storage portion, or alternatively a configuration having a flexible ink storing bag and a spring part which exerts a biasing force on the flexible ink storing bag in a direction of expanding its internal volume. The ink jet recording apparatus may employ a configuration of a line printer which aligns recording elements over the range corresponding to the whole width of the recording medium, other than a serial type of a recording type, which was described above.

EXAMPLES

The present invention will now be described in detail below with reference to examples and comparative examples. The present invention is not limited by the following examples as long as the present invention does not go beyond the scope of the invention. Note that, unless otherwise specified, the units of ink components of Examples and Comparative examples are "parts by mass". Furthermore, the term "parts" and the symbol "%" in the description below are on the basis of mass, unless otherwise specified.

<Preparation of Coloring Material>

Each exemplified compound was prepared according to the following steps. In addition, each obtained exemplified compound was subjected to the measurement of the maximum absorption wavelength ($\lambda_{max}$) of the absorption spectrum by using water as a solvent for the compound under the following conditions.

spectrophotometer: automatic recording spectrophotometer (trade name: U-3300; manufactured by Hitachi, Ltd.)
measurement cell: 1 cm quartz cell
sampling interval: 0.1 nm
scanning speed: 30 nm/min (Synthesis of Exemplified Compound I-5 and Measurement of Attributes)

Exemplified compound I-5 (M: sodium) was prepared by using a compound which was obtained by converting the dye of c-4 described in Japanese Patent Application Laid-Open No. 2005-139427 into a sodium salt type of a compound. The absorption spectrum of the exemplified compound I-5 was measured by using water as a solvent for the compound, and consequently showed the maximum absorption wavelength ($\lambda_{max}$) of 604 nm.

(Synthesis of Exemplified Compound III-1 and Measurement of Attributes)

Exemplified compound III-1 (M: sodium) was prepared by using a compound which was obtained by converting the dye that had been synthesized according to Example 1 of International Publication No. WO2006/001274 into a sodium salt type of a compound. The absorption spectrum of the exemplified compound III-1 was measured by using water as a solvent for the compound, and consequently showed the maximum absorption wavelength ($\lambda_{max}$) of 414 nm.

(Synthesis of Exemplified Compound IV-17 and Measurement of Attributes)

According to the following steps (a) to (d), exemplified compound IV-17 of a sodium salt type was synthesized.

(a) Synthesis of Compound of Formula (9)

A liquid was prepared by dissolving 25.3 parts of 2-aminobenzene-1,5-disultonic acid in 100 parts of water while controlling the pH to 5.0 to 6.0 through the addition of sodium hydroxide. After 31.3 parts of 35% hydrochloric acid had been added into the liquid, 19.0 parts of 40% aqueous sodium nitrite were added into the resultant liquid to form the diazo compound therein while the temperature of the liquid was set at 0 to 5° C. A liquid was prepared by dissolving 24.0 parts of the compound of the following formula (8) which had been obtained through a method described in Japanese Patent Application Laid-Open No. 2004-083492 into 240 parts of water while controlling the pH to 4.5 to 5.5 through the addition of sodium hydroxide; and the liquid was added to the diazo solution dropwise for approximately 20 minutes. Afterward, the pH of the liquid was adjusted to 2.0 to 3.0 by adding sodium carbonate while the liquid was kept at a temperature of 10 to 20° C., and the resultant liquid was stirred for three hours while being kept at the temperature and the pH. Subsequently, the liquid was salted out by adding sodium chloride into the liquid, and 42.1 parts of the compound in the following formula (9) were obtained by filtering, separating and drying the precipitate.

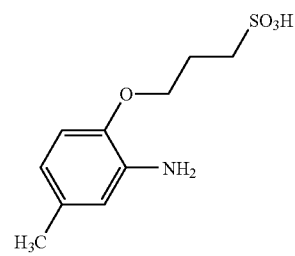

Formula (8)

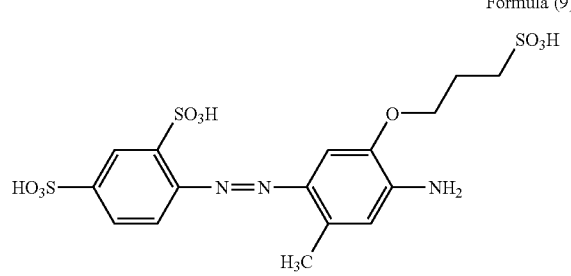

Formula (9)

(b) Synthesis of Compound of Formula (10)

A solution was prepared by suspending 7.6 parts of a compound of formula (9) which had been obtained in step (a) in 40 parts of water, and dissolving the compound by adjusting the pH to 4.0 to 5.0 through adding sodium hydroxide into the liquid. After 6.0 parts of 35% hydrochloric acid had been added into the liquid, 2.9 parts of 40% aqueous sodium nitrite were added into the resultant liquid to form the diazo compound while the temperature of the liquid was set at 15 to 25° C. A solution was prepared by dissolving 3.6 parts of a compound of formula (8) which was used in step (a) in 30 parts of water, and adjusting the pH to 4.5 to 5.5 through adding sodium hydroxide into the liquid; and the diazo suspension liquid was added into the liquid dropwise for approximately 30 minutes while keeping the temperature of the liquid at 15 to 25° C. While the diazo suspension liquid was added into the liquid dropwise, the pH of the liquid was kept at 3.5 to 4.5 by adding sodium carbonate. Subsequently, the liquid was stirred for two hours, and was salted out by adding sodium chloride; and a wet cake containing the disazo compound in the following formula (10) was obtained by filtering and separating the precipitate.

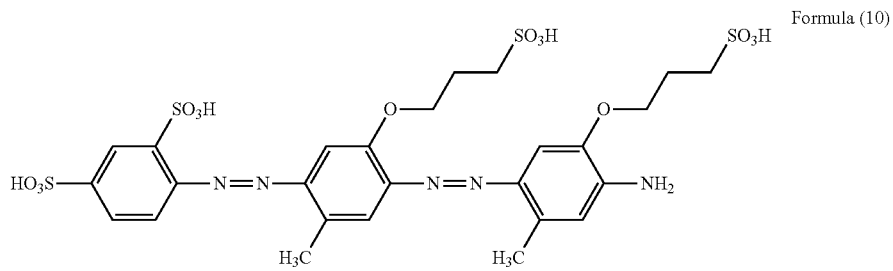

Formula (10)

(c) Synthesis of Compound of Formula (12)

A liquid was prepared by reacting 2-(cyanomethyl)benzimidazole with acetoacetic ethyl in ethanol and in the presence of sodium methoxide while heating the liquid. The compound of the following formula (11) was obtained by adding dilute hydrochloric acid into the liquid and acid-precipitating the compound, and 8.9 parts of the compound were slowly added into 64 parts of 6% fuming sulfuric acid while the temperature of the liquid was kept at 15 to 25° C. Subsequently, the liquid was stirred for two hours at the same temperature, and the obtained liquid was added dropwise into 190 parts of iced water for approximately 10 minutes. A compound in the following formula (12) was obtained by filtering, separating and drying the precipitated crystals.

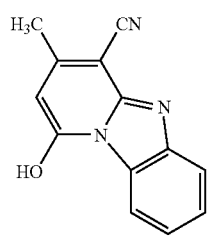

Formula (11)

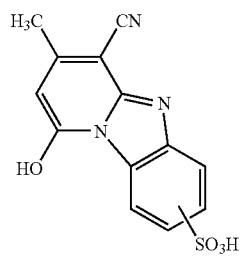

Formula (12)

(d) Synthesis of Exemplified Compound IV-17

The wet cake containing the disazo compound of formula (10), which had been obtained in step (b), was dissolved in 80 parts of water while the pH was adjusted to 6.0 to 7.0 by adding sodium hydroxide, and 2.3 parts of 40% aqueous sodium nitrite were added into the liquid. Subsequently, this solution was added dropwise into a mixed solution of 5.2 parts of 35% hydrochloric acid and 70 parts of water at 20 to 30° C. to form the diazo compound. A solution was prepared by dissolving 3.0 parts of the compound of formula (12) which had been obtained in step (c) in 50 parts of water while controlling the pH to 8.0 to 9.0 by adding sodium hydroxide, and the diazo suspension liquid was added dropwise into the solution at 20 to 30° C. The pH of the solution was kept at 7.0 to 8.0 by adding sodium carbonate while the diazo suspension liquid was added dropwise into the solution. Subsequently, the solution was stirred for two hours at the same temperature, and was salted out by adding sodium chloride. The precipitate was filtered and separated. The obtained wet cake was dissolved in 50 parts of water, was crystallized by adding 120 parts of methanol, and the precipitate was filtered and separated. The obtained wet cake was further dissolved in 50 parts of water, and exemplified compound IV-17 (sodium) was obtained by adding 120 parts of methanol to the solution to precipitate crystals and drying the crystals. Exemplified compound IV-17 was subjected to the measurement of the absorption spectrum, which employed water as a solvent for the compound, and showed the maximum absorption wavelength ($\lambda_{max}$) of 557.5 nm.

<Preparation of Ink>

Using the exemplified compounds I-5, III-1 and IV-17 which are coloring materials obtained above, and C.I. direct black 154, C.I. direct blue 199 and C.I. acid yellow 23, inks were individually prepared as follows. First, the components shown in the upper columns of Tables 4 and 5 below were each mixed and sufficiently stirred. Thereafter, the mixture was filtrated under pressure by a filter having a pore size of 0.2 µm to prepare inks according to Examples and Comparative Examples. In addition, main characteristics of each ink are shown in lower columns of Tables 4 and 5.

TABLE 4

Composition and main characteristics of ink
(Unit of components shown in upper columns: %)

| | Example | | | | |
|---|---|---|---|---|---|
| | 1 | 2 | 3 | 4 | 5 |
| Exemplified compound I-5 | 4.0 | 4.0 | 4.0 | 4.0 | 4.0 |
| Exemplified compound III-1 | | | | | |
| Exemplified compound IV-17 | | | | | |
| Bis(2-hydroxyethyl)sulfone | 0.9 | 1.0 | 30.0 | 30.5 | 25.0 |
| Glycerin | | | | | |
| 2-pyrrolidone | 7.0 | 7.0 | | | |
| Ethylene urea | | | | | |
| Diethylene glycol | | | | | |
| Triethylene glycol | | | | | |

TABLE 4-continued

Composition and main characteristics of ink
(Unit of components shown in upper columns: %)

|  | 1 | 2 | 3 | 4 | 5 |
|---|---|---|---|---|---|
| 1,5-pentanediol |  |  | 10.0 | 10.0 |  |
| Acetylenol E100 (*2) | 0.8 | 0.8 | 0.8 | 0.8 | 0.8 |
| Water | 77.3 | 77.2 | 65.2 | 64.7 | 70.2 |
| Content A [% by mass] of compound of general formula (II) | 0.9 | 1.0 | 30.0 | 30.5 | 25.0 |
| Content B [% by mass] of glycerin | 0.0 | 0.0 | 0.0 | 0.0 | 0.0 |
| A + B value | 0.9 | 1.0 | 30.0 | 30.5 | 25.0 |
| A/B value | — | — | — | — | — |

| Example | 6 | 7 | 8 | 9 | 10 | 11 | 12 |
|---|---|---|---|---|---|---|---|
| Exemplified compound I-5 | 4.0 | 4.0 | 4.0 | 4.0 | 4.0 | 4.0 | 4.0 |
| Exemplified compound III-1 |  |  |  |  |  |  |  |
| Exemplified compound IV-17 |  |  |  |  |  |  |  |
| Bis(2-hydroxyethyl)sulfone | 6.0 | 4.0 | 3.0 | 6.0 | 10.0 | 6.0 | 19.0 |
| Glycerin | 0.9 | 3.0 | 5.0 | 5.0 | 5.0 | 2.0 | 4.0 |
| 2-pyrrolidone | 5.0 | 7.0 | 7.0 | 5.0 | 5.0 | 7.0 | 5.0 |
| Ethylene urea |  |  |  |  |  |  |  |
| Diethylene glycol |  |  |  |  |  |  |  |
| Triethylene glycol |  |  |  |  |  |  |  |
| 1,5-pentanediol | 5.0 | 10.0 | 10.0 | 5.0 | 5.0 | 10.0 | 5.0 |
| Acetylenol E100 (*2) | 0.8 | 0.8 | 0.8 | 0.8 | 0.8 | 0.8 | 0.8 |
| Water | 78.3 | 71.2 | 70.2 | 74.2 | 70.2 | 70.2 | 62.2 |
| Content A [% by mass] of compound of general formula (II) | 6.0 | 4.0 | 3.0 | 6.0 | 10.0 | 6.0 | 19.0 |
| Content B [% by mass] of glycerin | 0.9 | 3.0 | 5.0 | 5.0 | 5.0 | 2.0 | 4.0 |
| A + B value | 6.9 | 7.0 | 8.0 | 11.0 | 15.0 | 8.0 | 23.0 |
| A/B value | 6.67 | 1.33 | 0.60 | 1.20 | 2.00 | 3.00 | 4.75 |

| Example | 13 | 14 | 15 | 16 | 17 | 18 |
|---|---|---|---|---|---|---|
| Exemplified compound I-5 | 4.0 | 4.0 | 4.0 | 4.0 | 4.0 | 4.0 |
| Exemplified compound III-1 |  |  |  |  |  |  |
| Exemplified compound IV-17 |  |  |  |  |  |  |
| Bis(2-hydroxyethyl)sulfone | 18.5 | 6.0 | 3.0 | 2.3 | 6.4 | 17.7 |
| Glycerin | 5.0 | 20.5 | 8.0 | 5.9 | 16.0 | 3.0 |
| 2-pyrrolidone |  | 5.0 | 5.0 | 7.0 | 5.0 | 5.0 |
| Ethylene urea |  |  |  |  |  |  |
| Diethylene glycol |  |  |  |  |  |  |
| Triethylene glycol |  |  |  |  |  |  |
| 1,5-pentanediol |  | 5.0 | 5.0 | 10.0 | 5.0 | 5.0 |
| Acetylenol E100 (*2) | 0.8 | 0.8 | 0.8 | 0.8 | 0.8 | 0.8 |
| Water | 71.7 | 58.7 | 74.2 | 70.0 | 62.8 | 64.5 |
| Content A [% by mass] of compound of general formula (II) | 18.5 | 6.0 | 3.0 | 2.3 | 6.4 | 17.7 |
| Content B [% by mass] of glycerin | 5.0 | 20.5 | 8.0 | 5.9 | 16.0 | 3.0 |
| A + B value | 23.5 | 26.5 | 11.0 | 8.2 | 22.4 | 20.7 |
| A/B value | 3.70 | 0.29 | 0.38 | 0.39 | 0.40 | 5.90 |

| Example | 19 | 20 | 21 | 22 | 23 |
|---|---|---|---|---|---|
| Exemplified compound I-5 | 4.0 | 4.0 | 1.5 | 1.5 | 1.5 |
| Exemplified compound III-1 |  |  | 0.8 | 0.8 | 0.8 |
| Exemplified compound IV-17 |  |  | 0.2 | 0.2 | 0.2 |
| Bis(2-hydroxyethyl)sulfone | 19.7 | 13.8 | 10.0 | 10.0 | 10.0 |
| Glycerin | 3.3 | 2.3 | 5.0 | 5.0 | 5.0 |
| 2-pyrrolidone | 5.0 | 5.0 | 5.0 |  |  |
| Ethylene urea |  |  |  | 5.0 | 5.0 |
| Diethylene glycol |  |  |  | 5.0 |  |
| Triethylene glycol |  |  |  |  | 5.0 |
| 1,5-pentanediol | 5.0 | 5.0 | 5.0 |  |  |
| Acetylenol E100 (*2) | 0.8 | 0.8 | 0.8 | 0.8 | 0.8 |
| Water | 62.2 | 69.1 | 71.7 | 71.7 | 71.7 |
| Content A [% by mass] of compound of general formula (II) | 19.7 | 13.8 | 10.0 | 10.0 | 10.0 |
| Content B [% by mass] of glycerin | 3.3 | 2.3 | 5.0 | 5.0 | 5.0 |
| A + B value | 23.0 | 16.1 | 15.0 | 15.0 | 15.0 |
| A/B value | 5.97 | 6.00 | 2.00 | 2.00 | 2.00 |

(*2) Acetylene glycol ethylene oxide adduct (surfactant; manufactured by Kawaken Fine Chemicals Co., Ltd.)

TABLE 5

Composition and main characteristics of ink
(Unit of components shown in upper columns: %)

| Comparative example | 1 | 2 | 3 | 4 | 5 | 6 | 7 |
|---|---|---|---|---|---|---|---|
| Exemplified compound I-5 | 4.0 | 4.0 | 4.0 | 2.5 |  |  |  |
| C.I. Direct Black 154 |  |  |  |  | 5.0 | 10.0 |  |
| C.I. Direct Blue 199 |  |  |  |  |  |  | 4.0 |
| Bis(2-hydroxyethyl)sulfone |  |  |  |  | 5.0 | 10.0 | 12.0 |
| Glycerin |  |  | 12.0 |  |  |  | 2.0 |
| 2-pyrrolidone |  | 7.0 | 8.0 |  | 15.0 |  |  |
| Urea |  |  |  |  |  | 5.0 |  |
| Ethylene glycol |  |  |  | 10.0 |  |  |  |
| Diethylene glycol |  | 2.0 |  |  |  |  |  |
| Triethylene glycol | 30.5 | 23.5 | 0.9 |  |  |  |  |
| 1,5-pentanediol |  |  | 10.0 |  |  |  |  |
| 1,2,6-hexanetriol |  |  |  |  |  |  | 7.0 |
| Isopropyl alcohol |  |  |  | 1.0 |  |  |  |
| Diethylene glycol monobutyl ether |  |  | 23.0 |  |  |  |  |
| Acetylenol E100 (*2) | 0.8 | 0.8 | 0.8 | 0.8 | 0.8 | 0.8 | 0.8 |
| Water | 64.7 | 71.7 | 77.3 | 51.7 | 69.2 | 59.2 | 74.2 |
| Content A [% by mass] of compound of general formula (II) | 0.0 | 0.0 | 0.0 | 0.0 | 5.0 | 10.0 | 12.0 |
| Content B [% by mass] of glycerin | 0.0 | 0.0 | 0.0 | 12.0 | 0.0 | 0.0 | 2.0 |
| A + B value | 0.0 | 0.0 | 0.0 | 12.0 | 5.0 | 10.0 | 14.0 |
| A/B value | — | — | — | 0.00 | — | — | 6.00 |

| Comparative example | 8 | 9 | 10 | 11 | 12 | 13 | 14 |
|---|---|---|---|---|---|---|---|
| C.I. Direct Black 154 |  |  |  | 4.0 | 4.0 | 3.0 | 5.0 |
| C.I. Direct Blue 199 | 4.0 |  | 5.0 |  |  |  |  |
| C.I. Acid Yellow 23 |  | 3.0 |  |  |  |  |  |
| Bis(2-hydroxyethyl)sulfone | 10.0 | 5.0 | 4.0 | 12.0 | 10.0 | 5.0 | 4.0 |
| Glycerin | 14.0 | 13.0 | 3.0 | 2.0 | 14.0 | 13.0 | 3.0 |
| Polyethylene glycol (*1) |  | 10.0 | 3.0 |  |  | 10.0 | 3.0 |
| 1,6-hexanediol | 5.0 |  | 7.0 |  | 5.0 |  | 7.0 |
| 1,2,6-hexanetriol |  |  |  | 7.0 |  |  |  |
| Trimethylolpropane |  |  | 3.0 |  |  |  | 3.0 |
| Acetylenol E100 (*2) | 0.8 | 0.8 | 0.8 | 0.8 | 0.8 | 0.8 | 0.8 |
| Water | 66.2 | 68.2 | 74.2 | 74.2 | 66.2 | 68.2 | 74.2 |

TABLE 5-continued

Composition and main characteristics of ink
(Unit of components shown in upper columns: %)

| Content A [% by mass] of compound of general formula (II) | 10.0 | 5.0 | 4.0 | 12.0 | 10.0 | 5.0 | 4.0 |
|---|---|---|---|---|---|---|---|
| Content B [% by mass] of glycerin | 14.0 | 13.0 | 3.0 | 2.0 | 14.0 | 13.0 | 3.0 |
| A + B value | 24.0 | 18.0 | 7.0 | 14.0 | 24.0 | 18.0 | 7.0 |
| A/B value | 0.71 | 0.38 | 1.33 | 6.00 | 0.71 | 0.38 | 1.33 |

(*1) Average molecular weight 200
(*2) Acetylene glycol ethylene oxide adduct (surfactant; manufactured by Kawaken Fine Chemicals Co., Ltd.)

<Evaluation>

(1) Color Tone

Each of the inks obtained in the above was set at an ink jet recording apparatus (trade name: PIXUS iP8600; manufactured by Canon Inc.) using thermal energy. Recording conditions were set at as follows: temperature: 23° C., relative humidity: 55%, recording density: 2,400 dpi×1,200 dpi, ejection volume: 2.5 pL. An image with a recording duty of 100% was recorded on a recording medium (trade name: PR-101; manufactured by Canon Inc.), and was air-dried at a temperature of 23° C. and at a relative humidity of 55% for 24 hours. A part of the image of the recorded matter which had been obtained in this way was subjected to the measurement of $L^*$, $a^*$ and $b^*$ in an $L^*$ $a^*$ $b^*$ color space specified by CIE (Commission Internationale de l'Eclairage (International Commission on Illumination)), and the color tone was evaluated. The above $L^*$, $a^*$ and $b^*$ were measured with the use of a spectrophotometer (Spectorolino; manufactured by Gretag Macbeth) on conditions of the light source of D50 and the visual field of 2 degrees. The evaluation criteria for the color tone are as follows. The evaluation result was shown in Table 6. In the present invention, when the image is evaluated as B or higher in the following evaluation criteria, the image can be a neutral one, A means the image has more neutral and particularly excellent color tone and C means the image has unacceptable level of color tone.

A: the image satisfies $0 \leq L^* \leq 50$, further $-15 \leq a^* \leq 15$ and $-15 \leq b^* \leq 15$.

B: the image satisfies $0 \leq L^* \leq 50$, further $-25 \leq a^* \leq 25$ and $-25 \leq b^* \leq 25$, but does not satisfy $-15 \leq a^* \leq 15$ and $-15 \leq b^* \leq 15$.

C: the image satisfies $0 \leq L^* \leq 50$ and further does not satisfy $-25 \leq a^* \leq 25$ and $-25 \leq b^* \leq 25$.

(2) Lightfastness

The image obtained in the above described operation was subjected to the measurement of the optical density (in which ISO Visual was used for spectral sensitivity characteristics) of the black color (hereinafter referred to as "optical density before testing). Furthermore, this recorded matter was exposed to light by using a super xenon testing machine (trade name: SX-75; manufactured by SUGA TEST INSTRUMENTS CO.,LTD.) for 168 hours, at the illumination intensity of 100 klux, the temperature in a tank of 24° C. and the relative humidity of 60%. Subsequently, a part of a portion recorded by a recording duty of 100% in the image of the recorded matter was subjected to the measurement of the optical density (in which ISO Visual was used for spectral sensitivity characteristics) for the black color (hereinafter referred to as "optical density after testing"). The above optical density was measured with the use of a spectrophotometer (Spectorolino; manufactured by Gretag Macbeth) on conditions of the light source of D50 and the visual field of 2 degrees. The lightfastness was evaluated by calculating a residual optical density rate from each of values of the optical density before and after testing, according to the following formula. The evaluation criteria of the lightfastness are as follows. The evaluation result was shown in Table 6. In the present invention, when the residual optical density rate is evaluated as B or higher in the following evaluation criteria, the lightfastness is evaluated to be sufficient; when the residual optical density rate is evaluated as A, the lightfastness is evaluated to be particularly excellent; and when the residual optical density rate is evaluated as C, the lightfastness is evaluated to be unacceptable.

residual optical density rate [%]=optical density after testing/optical density before testing×100

A: The residual optical density rate is 70% or more.

B: The residual optical density rate is 60% or more to less than 70%.

C: The residual optical density rate is less than 60%.

(3) Intermittent Ejection Stability

Each of the inks obtained in the above preparation steps was mounted on an ink jet recording apparatus which uses a thermal energy (trade name: PIXUS iP8600; manufactured by Canon Inc.). The ink jet recording apparatus was left in the environment of the temperature of 15° C. and a relative humidity of 10% for 5 hours or longer, and the ink was ejected from a predetermined nozzle in a similar environment to the above. Subsequently, the above described predetermined nozzle was not used for a fixed period of time and then the ink was ejected from the above described predetermined nozzle again to record an image on a recording medium (trade name: HR-101; manufactured by Canon Inc.). Thus obtained image was visually confirmed, and the intermittent ejection stability was evaluated. The evaluation criteria for the intermittent ejection stability are as follows. The evaluation result was shown in Table 6. In the present invention, when being evaluated as C or higher in the following evaluation criteria, the intermittent ejection stability is evaluated to be sufficient; when being evaluated as B, the intermittent ejection stability is evaluated to be excellent; when being evaluated as A, the intermittent ejection stability is evaluated to be particularly excellent; and when being evaluated as C, the intermittent ejection stability is evaluated to be unacceptable.

A: Even after the nozzle had not been used for 5 seconds, the image could be normally recorded.

B: Even after the nozzle had not been used for 3 seconds, the image could be normally recorded.

C: An image recorded after the nozzle had not been used for 3 seconds showed some degradation of the recording grade, but showed an acceptable level.

D: An image recorded after the nozzle had not been used for 3 seconds showed a spot at which the ink was not ejected, or disordered recording.

(4) Sticking Resistance

Each of the inks obtained in the above preparation steps was mounted on an ink jet recording apparatus which uses a thermal energy (trade name: PIXUS iP8600; manufactured by Canon Inc.). The above described ink jet recording apparatus was subjected to a recovery operation (cleaning) beforehand, and a nozzle check pattern of PIXUS iP8600 was recorded on a recording medium. Subsequently, while a carriage was working, a power cable was pulled out and thereby the recording head was left in a state of not being capped. In the state, the ink jet recording apparatus was left in the environment of the temperature of 30° C. and the relative humidity of 10% for 14 days. Afterward, the ink jet recording apparatus was left at the temperature of 25° C. for 6 hours to return itself to room temperature. By using the ink jet recording apparatus, the image was recorded while the ink jet recording apparatus carried out a recovery operation, and the sticking resistance was evaluated. The evaluation criteria of the sticking resistance are as follows. The evaluation result was shown in Table 6. In the present invention, when being evaluated as B or higher in the following evaluation criteria, the sticking resistance is evaluated to be sufficient; when being evaluated as A, the sticking resistance is evaluated to be particularly excellent; and when being evaluated as C, the sticking resistance is evaluated to be unacceptable.

A: After the recovery operation was carried out once or twice, the image could be normally recorded.

B: After the recovery operation was carried out three to ten times, the image could be normally recorded.

C: The image could not be normally recorded by the recovery operation of ten times or less.

(5) Recording Durability

Each of the inks obtained in the above preparation steps was mounted on an ink jet recording apparatus which uses a thermal energy (trade name: PIXUS iP3100; manufactured by Canon Inc.). After a predetermined number of electrical pulses had been applied to a heater of a recording head, a nozzle check pattern of PIXUS iP3100 was recorded, and the recording durability was evaluated by visually confirming the obtained nozzle check pattern. In the above operation, when the nozzle check pattern was normally recorded after the predetermined number of electrical pulses had been applied to the heater, the result means that a break in the heater did not occur. The evaluation criteria for the durability of the heater are as follows. The evaluation result was shown in Table 6. In the present invention, when being evaluated as B or higher in the following evaluation criteria, the recording durability is evaluated to be sufficient; when being evaluated as A, the recording durability is evaluated to be particularly excellent; and when being evaluated as C, the recording durability is evaluated to be unacceptable.

A: No break occurred in the heater even when pulses of $2.0 \times 10^8$ times had been applied to the heater.

B: A break occurred in a heater when pulses of $1.5 \times 10^8$ or more to $2.0 \times 10^8$ times or less had been applied to the heater.

C: A break occurred in the heater when pulses of less than $1.5 \times 10^8$ times had been applied to the heater.

TABLE 6

| | Evaluation result | | | | |
|---|---|---|---|---|---|
| | Color tone | Light-fastness | Recording durability | Sticking resistance | Intermittent ejection stability |
| Example 1 | B | B | B | B | B |
| Example 2 | B | A | B | B | B |
| Example 3 | B | A | B | B | B |
| Example 4 | B | A | B | B | C |
| Example 5 | B | A | B | B | B |
| Example 6 | B | A | B | A | B |
| Example 7 | B | A | B | A | B |
| Example 8 | B | A | A | A | A |
| Example 9 | B | A | A | A | A |
| Example 10 | B | A | A | A | A |
| Example 11 | B | A | A | A | A |
| Example 12 | B | A | A | A | A |
| Example 13 | B | A | B | A | B |
| Example 14 | B | A | B | A | B |
| Example 15 | B | A | B | A | A |
| Example 16 | B | A | A | A | B |
| Example 17 | B | A | A | A | A |
| Example 18 | B | A | A | A | A |
| Example 19 | B | A | A | A | B |

TABLE 6-continued

| | Evaluation result | | | | |
|---|---|---|---|---|---|
| | Color tone | Light-fastness | Recording durability | Sticking resistance | Intermittent ejection stability |
| Example 20 | B | A | B | A | A |
| Example 21 | A | A | A | A | A |
| Example 22 | A | A | A | A | A |
| Example 23 | A | A | A | A | A |
| Comparative example 1 | B | C | B | B | D |
| Comparative example 2 | B | C | B | B | C |
| Comparative example 3 | B | C | A | C | C |
| Comparative example 4 | B | C | C | B | D |
| Comparative example 5 | B | C | B | B | B |
| Comparative example 6 | B | C | A | B | B |
| Comparative example 7 | C | C | C | B | B |
| Comparative example 8 | C | C | B | A | B |
| Comparative example 9 | C | C | C | A | B |
| Comparative example 10 | C | C | A | B | B |
| Comparative example 11 | B | C | C | B | B |
| Comparative example 12 | B | C | B | A | B |
| Comparative example 13 | B | C | C | A | B |
| Comparative example 14 | B | C | A | B | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-072278, filed Mar. 19, 2008, which is hereby incorporated by reference herein in its entirety.

What is claimed is:

1. An ink jet ink comprising a compound represented by the following general formula (I) and a compound represented by the following general formula (II):

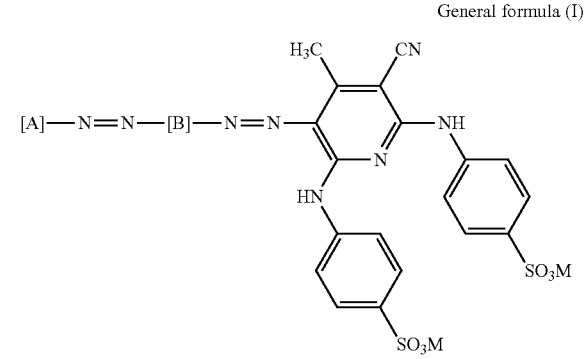

General formula (I)

wherein, in general formula (I), [A] represents an optionally substituted aromatic group or heterocyclic group; —[B]— represents a group represented by any one of the following general formulas (1) to (5); and M each independently represents any one of a hydrogen atom, an alkaline metal, ammonium and an organic ammonium,

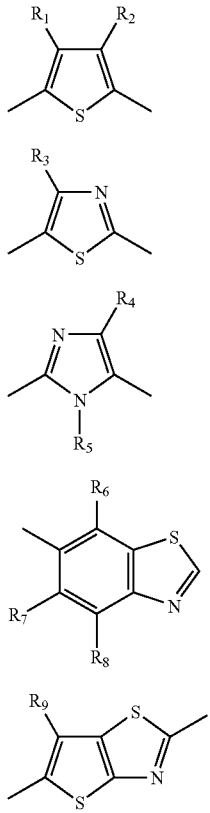

General formula (1)

General formula (2)

General formula (3)

General formula (4)

General formula (5)

heterocyclic sulfonyl group, an alkylsulfinyl or arylsulfinyl group, a heterocyclic sulfinyl group, a sulfamoyl group and a sulfonate group, wherein each of the groups is optionally substituted, and

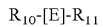

General formula (II)

wherein, in general formula (II), —[E]— represents —S—, —S(=O)—, or —S(=O)$_2$—; and $R_{10}$ and $R_{11}$ each independently represents any one of a hydrogen atom, a hydroxyl group, an alkyl group, a hydroxyalkyl group, an alkenyl group, an acyl group, a carbamoyl group, a carboxy group and a sulfonyl group, with the proviso that $R_{10}$ and $R_{11}$ cannot simultaneously be hydrogen atoms or hydroxyl groups or a hydrogen atom and a hydroxyl group.

2. The ink jet ink according to claim 1, wherein the content (% by mass) of a compound represented by the general formula (II) in the ink is in the range of 1.0% by mass or more to 30.0% by mass or less with respect to the total mass of the ink.

3. The ink jet ink according to claim 1, wherein the compound represented by the general formula (II) is bis(2-hydroxyethyl)sulfone.

4. The ink jet ink according to claim 1, further comprising glycerin.

5. The ink jet ink according to claim 4, wherein the total content (% by mass) of the compound represented by the general formula (II) and glycerin with respect to the total mass of the ink is in the range of 8.0% by mass or more to 23.0% by mass or less.

6. The ink jet ink according to claim 4, wherein the mass ratio of the content of the compound represented by the general formula (II) to the content of glyserol is in the range of 0.40 or more to 5.90 or less.

7. The ink jet ink according to claim 1, further comprising a compound represented by the following general formula (III) and a compound represented by the following general formula (IV):

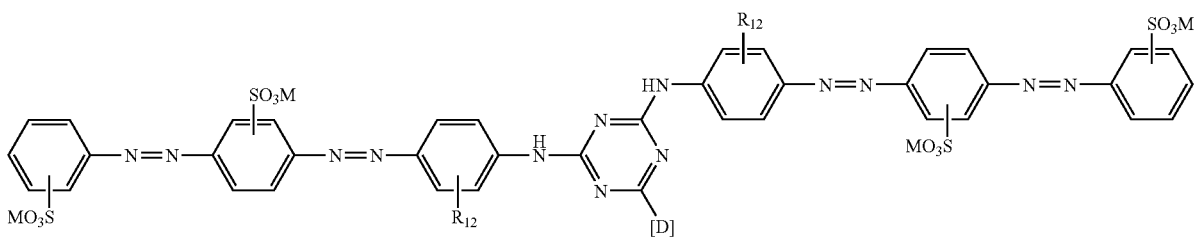

General formula (III)

wherein, in general formulas (1) to (5), $R_1$ to $R_9$ each independently represents any one of a hydrogen atom, a halogen atom, an aliphatic group, an aromatic group, a heterocyclic group, a carboxy group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino or arylsulfonylamino group, a heterocyclic sulfonylamino group, a cyano group, a nitro group, an alkylthio or arylthio group, a heterocyclic thio group, an alkylsulfonyl or arylsulfonyl group, a wherein, in general formula (III), $R_{12}$ each independently represents any one of a hydrogen atom, a hydroxyl group, a carboxy group, an alkyl group having 1 to 4 carbon atoms, which is optionally substituted with a hydroxyl group or an alkoxy group having 1 to 4 carbon atoms, an alkoxy group having 1 to 4 carbon atoms, which is optionally substituted with a hydroxyl group or an alkoxy group having 1 to 4 carbon atoms, an alkylamino group having 1 to 4 carbon atoms, which is optionally substituted with a hydroxyl group or an alkoxy group having 1 to 4 carbon atoms, a carboxy-alkylamino group in which the alkyl has 1 to 5 carbon atoms, a bis-[carboxy-alkyl]amino group in which the alkyl has 1 to 5 carbon atoms, an alkanoylamino group having 1 to 4 carbon atoms, which is optionally substituted with a hydroxyl group or an alkoxy group having 1 to 4 carbon atoms, a phenylamino group, which is optionally substituted with a carboxy group, a sulfonate group or an amino group, a sulfonate group, a halogen atom and an ureido group; [D] represents an aliphatic amine residue having a carboxy group or a sulfonate group; and M each independently represents any one of a hydrogen atom, an alkaline metal, ammonium and an organic ammonium, General formula (IV)

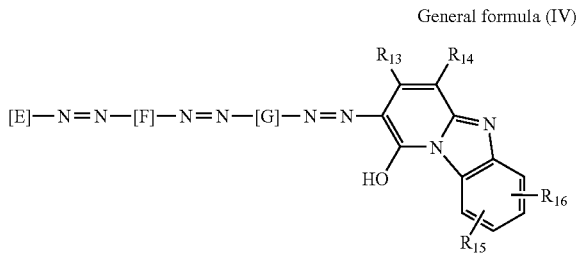

wherein, in general formula (IV), [E] represents a phenyl group having a substituent, wherein the substituent is each independently any one selected from the group consisting of a carboxy group, a sulfonate group, a chlorine atom, a cyano group, a nitro group, a sulfamoyl group, an alkyl group having 1 to 4 carbon atoms, an alkoxy group having 1 to 4 carbon atoms which is optionally substituted with a hydroxyl group, an alkoxy group having 1 to 4 carbon atoms, a sulfonate group or a carboxy group, and an alkylsulfonyl group having 1 to 4 carbon atoms which is optionally substituted with a hydroxyl group, a sulfonate group or a carboxy group; [F] and [G] each independently represents a para-phenylene group having a substituent, wherein the substituent is each independently any one selected from the group consisting of a carboxy group, a sulfonate group, an alkyl group having 1 to 4 carbon atoms, an alkoxy group having 1 to 4 carbon atoms which is optionally substituted with a hydroxyl group, an alkoxy group having 1 to 4 carbon atoms, a sulfonate group or a carboxy group, and an alkylsulfonyl group having 1 to 4 carbon atoms which is optionally substituted with a hydroxyl group, a sulfonate group or a carboxy group; $R_{13}$ represents any of an alkyl group having 1 to 4 carbon atoms, which is optionally substituted with a carboxy group, a phenyl group, which is optionally substituted with a sulfonate group, and a carboxy group; $R_{14}$ represents any of a cyano group, a carbamoyl group and a carboxy group; and $R_{15}$ and $R_{16}$ each independently represents any of a hydrogen atom, a methyl group, a chlorine atom and a sulfonate group.

8. An ink jet recording method comprising ejecting an ink by an ink jet system to record an image, wherein the ink comprises the ink jet ink according to claim 1.

9. An ink cartridge having an ink storage portion for storing an ink provided therein, wherein the ink comprises the ink jet ink according to claim 1.

10. A recording unit having an ink storage portion for storing an ink and a recording head for ejecting the ink provided therein, wherein the ink comprises the ink jet ink according to claim 1.

11. An ink jet recording apparatus having an ink storage portion for storing an ink and a recording head for ejecting an ink provided therein, wherein the ink comprises the ink jet ink according to claim 1.

* * * * *